United States Patent
Koudai et al.

(10) Patent No.: US 12,263,897 B2
(45) Date of Patent: Apr. 1, 2025

(54) STEERING CONTROL SYSTEM AND STEERING CONTROL METHOD

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Takashi Koudai, Okazaki (JP); Yuji Fujita, Okazaki (JP); Yugo Nagashima, Anjo (JP); Kazuma Hasegawa, Anjo (JP); Yuuta Kajisawa, Okazaki (JP); Masaharu Yamashita, Toyota (JP); Atsushi Satou, Miyoshi (JP); Yosuke Yamashita, Nagoya (JP); Kazuaki Iida, Toyota (JP); Shintaro Takayama, Toyota (JP); Takeshi Iwana, Kariya (JP); Toyohiro Hayashi, Kariya (JP); Hayaki Tanabe, Kariya (JP); Nobuyori Nakajima, Kariya (JP); Hiroki Tomizawa, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 104 days.

(21) Appl. No.: 18/222,122

(22) Filed: Jul. 14, 2023

(65) Prior Publication Data
US 2024/0025473 A1    Jan. 25, 2024

(30) Foreign Application Priority Data
Jul. 21, 2022   (JP) .................... 2022-116643

(51) Int. Cl.
*B62D 5/04* (2006.01)
*B62D 6/00* (2006.01)
*B62D 15/02* (2006.01)

(52) U.S. Cl.
CPC ......... *B62D 5/0481* (2013.01); *B62D 5/0457* (2013.01); *B62D 5/0463* (2013.01);
(Continued)

(58) Field of Classification Search
None
See application file for complete search history.

(56) References Cited

U.S. PATENT DOCUMENTS 7,295,907 B2 *  11/2007  Lu ................... B62D 15/0245
                                                      318/400.38
7,481,294 B2 *   1/2009  Fujita ............... B62D 15/0245
                                                            701/41
(Continued)

FOREIGN PATENT DOCUMENTS

CN   110520346 A  * 11/2019 ........... B60R 16/027
CN   110520346 B  * 12/2021 ........... B60R 16/027
(Continued)

OTHER PUBLICATIONS

Nov. 22, 2023 Extended Search Report issued in European Patent Application No. 23186285.5.

*Primary Examiner* — Kevin R Steckbauer
(74) *Attorney, Agent, or Firm* — Oliff PLC

(57) ABSTRACT

A steering control system that controls a steering device of a vehicle includes a storage unit, and a control unit configured to make a state transition to a normal control state via a start-up state after a power source system of the vehicle is started. In the start-up state, the control unit executes a correction information storing process of acquiring correction element information using a state variable obtained from the steering device and writing correction information
(Continued)

obtained based on the correction element information into the storage unit. In the start-up state, the control unit is configured to execute an abnormal condition determination process of determining whether an abnormal condition indicating that the correction information is abnormal is met. The correction information storing process is re-executed when the abnormal condition is met. The abnormal condition determination process is executed at least either before or after the correction information storing process.

6 Claims, 6 Drawing Sheets

(52) U.S. Cl.
CPC .............. *B62D 6/00* (2013.01); *B62D 15/02* (2013.01); *B62D 15/021* (2013.01); *B62D 15/0245* (2013.01)

(56) References Cited

U.S. PATENT DOCUMENTS

| | | | | |
|---|---|---|---|---|
| 7,512,468 | B2 * | 3/2009 | Tamaizumi | B62D 15/0245 180/443 |
| 7,849,957 | B2 * | 12/2010 | Hara | B62D 5/049 180/446 |
| 8,392,066 | B2 * | 3/2013 | Ehara | B62D 15/021 701/41 |
| 8,594,892 | B2 * | 11/2013 | Fujimoto | B62D 15/024 703/2 |
| 8,731,775 | B2 * | 5/2014 | Kobayashi | B62D 5/049 180/443 |
| 9,079,607 | B2 * | 7/2015 | Tanimoto | B62D 5/046 |
| 9,227,653 | B2 * | 1/2016 | Kita | B62D 3/126 |
| 10,494,018 | B2 * | 12/2019 | Yamashita | B62D 5/0469 |
| 10,933,913 | B2 * | 3/2021 | Yoo | B62D 15/0215 |
| 11,465,683 | B2 * | 10/2022 | Kozawa | B62D 5/0484 |
| 11,661,107 | B2 * | 5/2023 | Uchino | B62D 6/008 701/41 |
| 11,814,121 | B2 * | 11/2023 | Kakimoto | B62D 5/001 |
| 11,840,295 | B2 * | 12/2023 | Kakimoto | B62D 6/008 |
| 12,030,559 | B2 * | 7/2024 | Kakimoto | B62D 15/021 |
| 2002/0065593 | A1 * | 5/2002 | Ozaki | B62D 15/02 180/443 |
| 2006/0070794 | A1 * | 4/2006 | Fujita | B62D 15/0245 180/446 |
| 2006/0085113 | A1 * | 4/2006 | Tamaizumi | B62D 5/0463 701/41 |
| 2006/0293818 | A1 * | 12/2006 | Lu | B62D 15/0235 701/41 |
| 2008/0078608 | A1 * | 4/2008 | Hara | B62D 5/0484 180/446 |
| 2010/0286868 | A1 * | 11/2010 | Ehara | B62D 15/021 701/41 |
| 2012/0303218 | A1 * | 11/2012 | Tamura | B62D 1/046 701/41 |
| 2016/0251030 | A1 * | 9/2016 | Okada | G06T 1/0007 345/633 |
| 2018/0079447 | A1 * | 3/2018 | Yamashita | B62D 5/0469 |
| 2018/0237068 | A1 * | 8/2018 | Yoo | B60W 10/20 |
| 2019/0193789 | A1 * | 6/2019 | Hosono | B62D 15/0235 |
| 2020/0047806 | A1 * | 2/2020 | Kozawa | B62D 5/0484 |
| 2021/0309290 | A1 * | 10/2021 | Uchino | B62D 6/002 |
| 2021/0394820 | A1 * | 12/2021 | Kakimoto | B62D 15/0205 |
| 2021/0394824 | A1 * | 12/2021 | Kakimoto | B62D 5/001 |
| 2021/0394825 | A1 * | 12/2021 | Kakimoto | B62D 15/0205 |
| 2023/0294761 | A1 * | 9/2023 | Kakimoto | B62D 5/001 701/41 |
| 2023/0365186 | A1 * | 11/2023 | Narayan | B62D 15/0235 |
| 2023/0391397 | A1 * | 12/2023 | Kim | B62D 5/0457 |
| 2024/0025471 | A1 * | 1/2024 | Koudai | B62D 5/046 |
| 2024/0025473 | A1 * | 1/2024 | Koudai | B62D 15/021 |

FOREIGN PATENT DOCUMENTS

| | | | | |
|---|---|---|---|---|
| CN | 117429498 A | * | 1/2024 | ............. B62D 5/046 |
| EP | 1907261 A1 | | 4/2008 | ......... B62D 15/0235 |
| EP | 2628659 A2 | * | 8/2013 | ......... B62D 15/0215 |
| EP | 1907261 B1 | * | 8/2014 | ......... B62D 15/0235 |
| EP | 3 925 863 A1 | | 12/2021 | |
| EP | 3925858 A1 | * | 12/2021 | ......... B62D 15/0205 |
| EP | 3925858 A4 | * | 12/2021 | ......... B62D 15/0205 |
| EP | 3929061 A1 | * | 12/2021 | ............. B62D 5/001 |
| EP | 3929061 B1 | * | 1/2024 | ............. B62D 5/001 |
| EP | 3925858 B1 | * | 6/2024 | ......... B62D 15/0205 |
| JP | 6747367 B2 | * | 8/2020 | ........... B60R 16/027 |
| JP | 2021075068 A | * | 5/2021 | |
| JP | 2021-195086 A | | 12/2021 | |
| JP | 2024014071 A | * | 2/2024 | ............. B62D 5/046 |
| SE | 524955 C2 | * | 10/2004 | ............. B62D 15/02 |
| WO | WO-2006137991 A1 | * | 12/2006 | ......... B62D 15/0235 |
| WO | WO-2018194024 A1 | * | 10/2018 | ........... B60R 16/027 |
| WO | WO-2018194029 A1 | * | 10/2018 | ........... B60R 16/027 |
| WO | WO-2023220465 A1 | * | 11/2023 | ........... B62D 5/0466 |

* cited by examiner

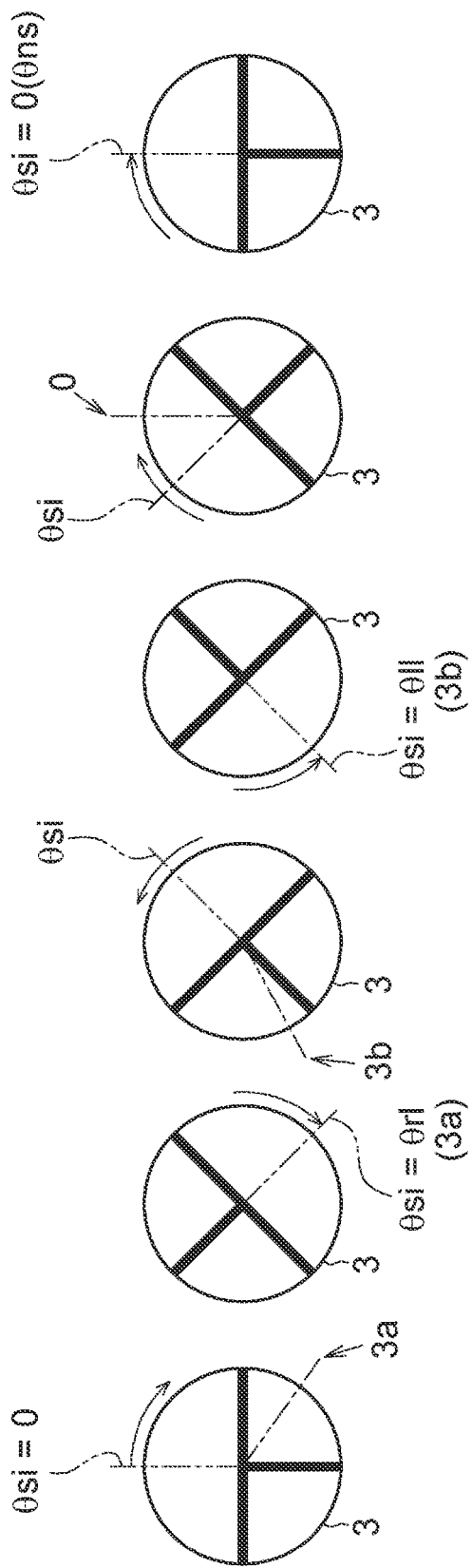
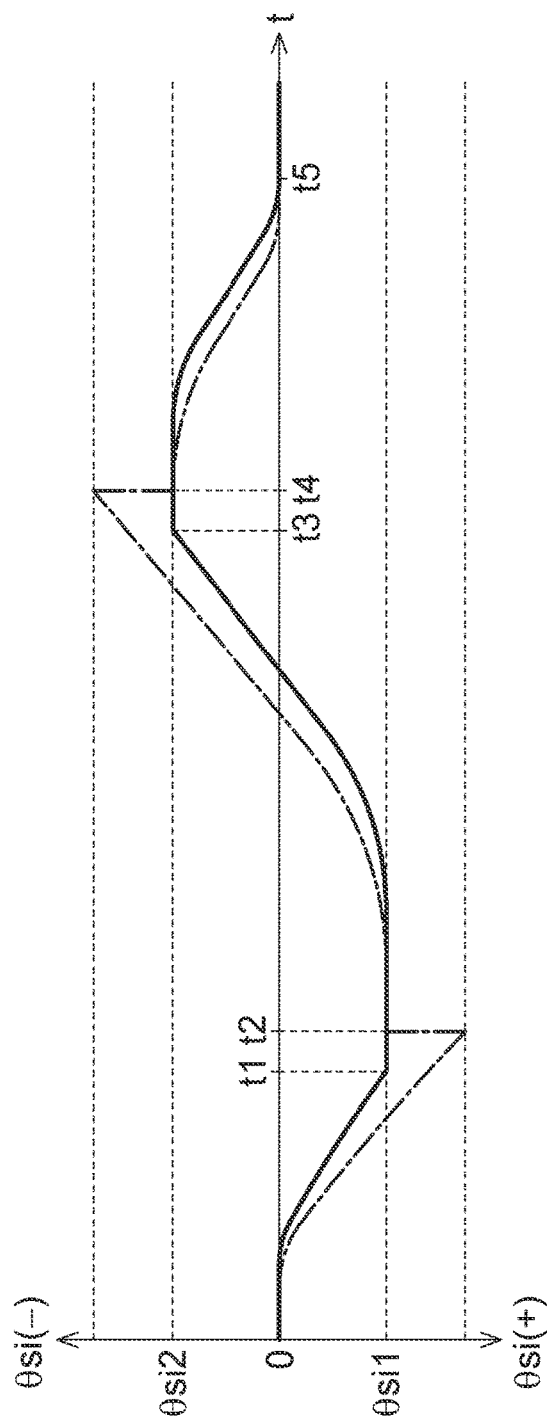

STEERING CONTROL SYSTEM AND STEERING CONTROL METHOD

CROSS-REFERENCE TO RELATED APPLICATION

This application claims priority to Japanese Patent Application No. 2022-116643 filed on Jul. 21, 2022, incorporated herein by reference in its entirety.

BACKGROUND

1. Technical Field

The present disclosure relates to a steering control system and a steering control method.

2. Description of Related Art

For example, Japanese Unexamined Patent Application Publication No. 2021-195086 (JP 2021-195086 A) describes a steer-by-wire steering device that is installed in a vehicle. The steer-by-wire steering device has a structure in which a power transmission path between a steering wheel of the vehicle and turning wheels of the vehicle is cut off. Such a steer-by-wire steering device includes a steering control system that controls the steering device as a target.

In this steering control system, steering angle midpoint information that serves as a reference when calculating a steering angle of the steering wheel to be used for control is stored in a memory. However, the steering angle midpoint information having been stored in the memory can disappear, for example, when a battery is removed from the vehicle. The steering control system is configured to execute a process for storing the steering angle midpoint information in the memory once again when the steering angle midpoint information has disappeared.

SUMMARY

In the case where the steering angle midpoint information is stored in the memory once again as described above, an abnormality in the memory can occur, for example, due to an abnormality in writing into the memory or to writing of steering angle midpoint information that is abnormal in the first place. When an abnormality in the memory occurs, the steering angle of the steering wheel to be used for control will be obtained with reference only to abnormal steering angle midpoint information. This leads to deviation from an actual state of the steering device.

A steering control system according to a first aspect of the present disclosure controls a steering device of a vehicle. The steering device has a structure in which a power transmission path between a steering unit having an operation member and a turning unit configured to turn turning wheels is cut off. The steering control system has a storage unit that stores information relating to control of the steering device, and a control unit configured to make a state transition to a normal control state via a start-up state after a power source system of the vehicle is started. The start-up state is a state where the control unit executes a correction information storing process of acquiring correction element information using a state variable obtained from the steering device and further writing correction information obtained based on the acquired correction element information into the storage unit. The normal control state is a state where the control unit executes a normal process of controlling the steering device using a control variable that is obtained by correcting the state variable based on the correction information. The control unit is configured to execute, in the start-up state, an abnormal condition determination process of determining whether an abnormal condition indicating that the correction information having been written into the storage unit through the correction information storing process is abnormal is met. The correction information storing process is a process that is re-executed when the abnormal condition is met. The abnormal condition determination process is a process that is executed at least either before or after the correction information storing process.

A steering control method according to a second aspect of the present disclosure is a method of controlling a steering device of a vehicle. The steering device has a structure in which a power transmission path between a steering unit having an operation member and a turning unit configured to turn turning wheels is cut off. The steering control method includes storing information relating to control of the steering device, and making a state transition to a normal control state via a start-up state after a power source system of the vehicle is started. The start-up state is a state where a correction information storing process is executed, the correction information storing process acquires correction element information using a state variable obtained from the steering device and further stores correction information obtained based on the acquired correction element information. The normal control state is a state where a normal process is executed, the normal process controls the steering device using a control variable that is obtained by correcting the state variable based on the correction information. The method includes executing, in the start-up state, an abnormal condition determination process of determining whether an abnormal condition indicating that the correction information having been stored through the correction information storing process is abnormal is met. The correction information storing process is a process that is re-executed when the abnormal condition is met. The abnormal condition determination process is a process that is executed at least either before or after the correction information storing process.

In the configuration according to the above-described aspect and the method according to the above-described aspect, even when the correction information written in the storage unit is abnormal in the start-up state, the control unit can use the correct correction information by re-executing the correction information storing process. Thus, the control unit can create a situation where the state variable can be corrected based on the correction information. Therefore, the control variable is less likely to deviate from the actual state of the steering device.

In the steering control system according to the above-described aspect, the control unit may be configured to execute, in the start-up state, an abnormality information storing process of writing abnormal condition information into the storage unit when writing of the correction information into the storage unit has failed to be completed. The abnormal condition determination process may be a process that is executed before the correction information storing process, and may include a process of determining that the abnormal condition is met when the abnormal condition information has been written in the storage unit.

In this configuration, even when writing of the correction information into the storage unit fails to be completed, the correction information storing process can be re-executed when the power source system of the vehicle is started next time. Thus, the control unit can correct the state variable based on the correct correction information.

In the steering control system according to the above-described aspect, the control unit may be configured to execute, in the start-up state, a battery replacement condition determination process of determining whether a battery replacement condition indicating a state after a battery belonging to the power source system of the vehicle has been removed and replaced is met. The correction information storing process may be a process that is executed when the battery replacement condition is met and may be a process that is not executed when the battery replacement condition is not met. The abnormal condition determination process may be a process that is executed before the battery replacement condition determination process.

In this configuration, even when the battery replacement condition is not met and therefore the correction information storing process need not be executed, the correction information storing process is executed when the abnormal condition is met. In the start-up state, the control unit can appropriately respond to an abnormality in the storage unit relating to the correction information having been written into the storage unit through the correction information storing process. Thus, the reliability of the accuracy of the correction information can be increased.

In the steering control system according to the above-described aspect, the steering device may include a sensor that detects an actually measured value corresponding to the control variable obtained by correction based on the correction information. The abnormal condition determination process may be a process that is executed after the correction information storing process, and may include a process of determining whether the abnormal condition is met based on a result of comparing the control variable obtained by correction based on the correction information and the actually measured value obtained from the sensor.

In this configuration, even when the correction information obtained through the correction information storing process executed during the period of the start-up state is itself not a normal value, the correction information storing process can be re-executed during the same period of the start-up state. Thus, the control unit can correct the state variable based on the correct correction information.

In the steering control system according to the above-described aspect, the correction information may include steering-side correction information and turning-side correction information. The steering-side correction information may be information for correcting a control variable for steering that is used when controlling the steering unit, and the turning-side correction information may be information for correcting a control variable for turning that is used when controlling the turning unit. The correction information storing process may include a steering-side correction information storing process and a turning-side correction information storing process. The steering-side correction information storing process may be a process of acquiring steering-side correction element information using a state variable obtained from the steering unit and further writing the steering-side correction information obtained based on the acquired steering-side correction element information into the storage unit. The turning-side correction information storing process may be a process of acquiring turning-side correction element information using a state variable obtained from the turning unit and further writing the turning-side correction information obtained based on the acquired turning-side correction element information into the storage unit. The abnormal condition determination process may include a process of determining whether an abnormal condition indicating that the steering-side correction information having been written into the storage unit through the steering-side correction information storing process is abnormal is met, and a process of determining whether an abnormal condition indicating that the turning-side correction information having been written into the storage unit through the turning-side correction information storing process is abnormal is met.

In this configuration, the steering control system can correct the state variables relating respectively to the steering unit and the turning unit. Therefore, the control variables used to respectively control the steering unit and the turning unit are less likely to deviate from the actual states of the respective units.

The present disclosure can reduce the likelihood of deviation from the actual state of the steering device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a view showing motion of a steering wheel during the steering-side correction information storing process of FIG. 3;

FIG. 5B is another view showing motion of the steering wheel during the steering-side correction information storing process of FIG. 3;

FIG. 5C is another view showing motion of the steering wheel during the steering-side correction information storing process of FIG. 3;

FIG. 5D is another view showing motion of the steering wheel during the steering-side correction information storing process of FIG. 3;

FIG. 5E is another view showing motion of the steering wheel during the steering-side correction information storing process of FIG. 3;

FIG. 5F is another view showing motion of the steering wheel during the steering-side correction information storing process of FIG. 3;

FIG. 5G is a graph showing changes in a temporary steering angle $\theta si$ and a steering target angle $\theta s^*$;

DETAILED DESCRIPTION OF EMBODIMENTS

First Embodiment

Figure 1:
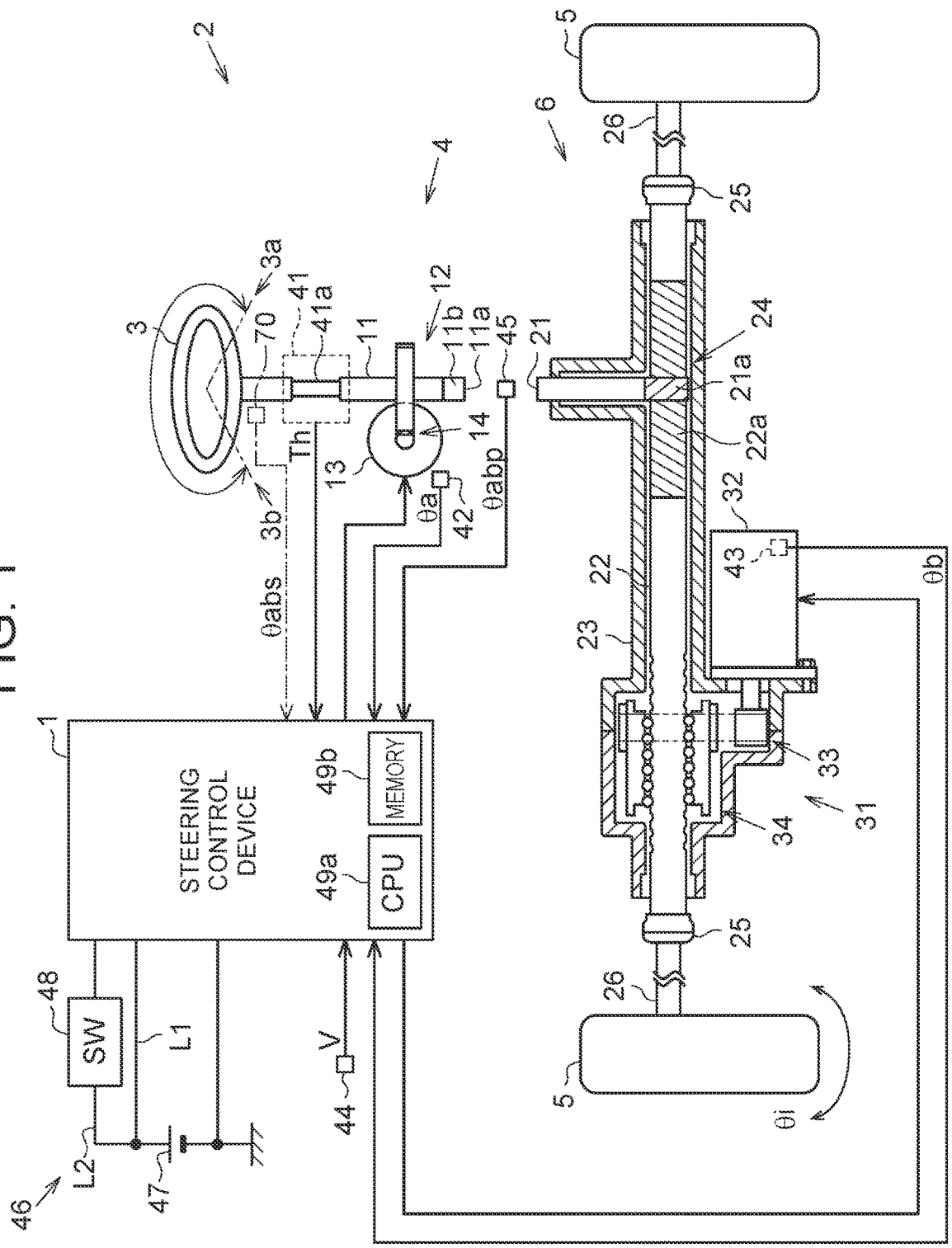
FIG. 1 is a view showing a configuration of a steer-by-wire steering device according to a first embodiment.

A first embodiment of the present disclosure will be described below. As shown in FIG. 1, a steering control device 1 (steering control system) controls a steering device 2 as a target. The steering device 2 is configured as a steer-by-wire vehicle steering device. The steering device 2 includes a steering unit 4 and a turning unit 6. The steering unit 4 is steered by a driver through a steering wheel 3 of the vehicle that is an operation member. The turning unit 6 turns left and right turning wheels 5 of the vehicle according to steering input into the steering unit 4 by the driver. The steering device 2 of this embodiment has, for example, a structure in which a power transmission path between the steering unit 4 and the turning unit 6 is always mechanically cut off. In this structure, a power transmission path between a steering actuator 12, to be described later, and a turning actuator 31, to be described later, is always mechanically cut off.

The steering unit 4 includes a steering shaft 11 and the steering actuator 12. The steering shaft 11 is coupled to the steering wheel 3. An end portion 11a of the steering shaft 11 on the opposite side from the side coupled to the steering wheel 3 has a stopper mechanism 11b. The stopper mechanism 11b defines a rotation range of the steering shaft 11. Thus, a rotation range of the steering wheel 3 that rotates integrally with the steering shaft 11 is defined by the stopper mechanism 11b. For example, the steering wheel 3 can rotate between a rightward rotation limit position 3a and a leftward rotation limit position 3b as the rotation range. The steering actuator 12 has a steering-side motor 13 that is a driving source, and a steering-side speed reduction mechanism 14. The steering-side motor 13 is a reaction force motor that applies a steering reaction force, which is a force acting against steering, to the steering wheel 3 through the steering shaft 11. The steering-side motor 13 is coupled to the steering shaft 11 through the steering-side speed reduction mechanism 14 that is formed by, for example, a worm and wheel. As the steering-side motor 13 of this embodiment, for example, a three-phase brushless motor is adopted.

The turning unit 6 includes a pinion shaft 21, a rack shaft 22 as a turning shaft, and a rack housing 23. The pinion shaft 21 and the rack shaft 22 are coupled together at a predetermined intersection angle. Pinion teeth 21a formed on the pinion shaft 21 and rack teeth 22a formed on the rack shaft 22 are meshed with each other to form a rack-and-pinion mechanism 24. Thus, the pinion shaft 21 corresponds to a rotating shaft of which the angle can be converted into a turning angle θi that is a turning position of the turning wheels 5. The rack housing 23 houses the rack-and-pinion mechanism 24. One end of the pinion shaft 21 on the opposite side from the side coupled to the rack shaft 22 protrudes from the rack housing 23. Both ends of the rack shaft 22 protrude from both ends of the rack housing 23 in an axial direction. At both ends of the rack shaft 22, tie rods 26 are coupled through rack ends 25 formed by ball joints. Leading ends of the tie rods 26 are coupled to knuckles (not shown) on which the left and right turning wheels 5 are respectively mounted.

The turning unit 6 includes the turning actuator 31. The turning actuator 31 includes a turning-side motor 32 that is a driving source, a transmission mechanism 33, and a conversion mechanism 34. The turning-side motor 32 applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts rotation of the turning-side motor 32 into reciprocating motion of the rack shaft 22 through the conversion mechanism 34 that is formed by, for example, a ball screw mechanism. As the turning-side motor 32 of this embodiment, for example, a three-phase brushless motor is adopted.

In the steering device 2 thus configured, the turning angle θi of the turning wheels 5 is changed as a motor torque is applied as a turning force from the turning actuator 31 to the rack shaft 22 according to the driver's steering operation. Meanwhile, a steering reaction force that acts against the driver's steering is applied from the steering actuator 12 to the steering wheel 3. As a result, in the steering device 2, a steering torque Th required to steer the steering wheel 3 is changed by the steering reaction force that is a motor torque applied from the steering actuator 12.

The reason for providing the pinion shaft 21 is to support the rack shaft 22 inside the rack housing 23 along with the pinion shaft 21. By a support mechanism (not shown) provided in the steering device 2, the rack shaft 22 is supported so as to be movable along its axial direction as well as is pressed toward the pinion shaft 21. Thus, the rack shaft 22 is supported inside the rack housing 23. However, another support mechanism that supports the rack shaft 22 in the rack housing 23 without using the pinion shaft 21 may be provided.

Electrical Configuration of Steering Device

As shown in FIG. 1, the steering-side motor 13 and the turning-side motor 32 are connected to the steering control device 1. The steering control device 1 controls operation of the steering-side motor 13 and the turning-side motor 32.

Detection results of various sensors are input into the steering control device 1. The various sensors are connected to the steering control device 1. The various sensors include, for example, a torque sensor 41, a steering-side rotation angle sensor 42, a turning-side rotation angle sensor 43, a vehicle speed sensor 44, and a pinion absolute angle sensor 45.

The torque sensor 41 detects the steering torque Th that is a value indicating a torque having been applied to the steering shaft 11 by the driver's steering operation. The steering-side rotation angle sensor 42 detects a rotation angle θa that is an angle of a rotating shaft of the steering-side motor 13 within a range of 360°. The turning-side rotation angle sensor 43 detects a rotation angle θb that is an angle of a rotating shaft of the turning-side motor 32 within a range of 360°. The vehicle speed sensor 44 detects a vehicle speed V that is a travel speed of the vehicle. The pinion absolute angle sensor 45 detects a pinion absolute rotation angle θabp that is an actually measured value of the angle of a rotational axis of the pinion shaft 21 within a range exceeding 360°.

Specifically, the torque sensor 41 is provided on the steering shaft 11, at a part closer to the steering wheel 3 than the steering-side speed reduction mechanism 14 is. The torque sensor 41 detects the steering torque Th based on twisting of a torsion bar 41a that is provided at an intermediate portion of the steering shaft 11. The steering torque Th is detected, for example, as a positive value when the vehicle is steered rightward and as a negative value when the vehicle is steered leftward.

The steering-side rotation angle sensor 42 is provided in the steering-side motor 13. The rotation angle θa of the steering-side motor 13 is used to calculate a steering angle θs. The steering-side motor 13 and the steering shaft 11 operate in conjunction with each other through the steering-side speed reduction mechanism 14. Thus, there is a correlation between the rotation angle θa of the steering-side motor 13 and the rotation angle of the steering shaft 11. Further, there is a correlation between the rotation angle θa of the steering-side motor 13 and the steering angle θs that is a rotation angle indicating the rotational position of the steering wheel 3. Therefore, the steering angle θs can be calculated based on the rotation angle θa of the steering-side motor 13. The rotation angle θa is detected, for example, as a positive value when the vehicle is steered rightward and as a negative value when the vehicle is steered leftward.

The turning-side rotation angle sensor 43 is provided in the turning-side motor 32. The rotation angle θb of the turning-side motor 32 is used to calculate a pinion angle θp. The turning-side motor 32 and the pinion shaft 21 operate in conjunction with each other through the transmission mechanism 33, the conversion mechanism 34, and the rack-and-pinion mechanism 24. Thus, there is a correlation between the rotation angle θb of the turning-side motor 32 and the pinion angle θp that is the rotation angle of the pinion shaft 21. Therefore, the pinion angle θp can be obtained based on the rotation angle θb of the turning-side motor 32. The pinion shaft 21 is meshed with the rack shaft 22. Thus, there is also a correlation between the pinion angle θp and the amount of movement of the rack shaft 22. The pinion angle θp is angle information indicating the turning state of the turning wheels 5 and is a value reflecting the turning angle θi that is the turning position of the turning wheels 5. The rotation angle θb is detected, for example, as a positive value when the vehicle is steered rightward and as a negative value when the vehicle is steered leftward.

The pinion absolute angle sensor 45 is provided on the pinion shaft 21. The pinion absolute rotation angle θabp of the pinion shaft 21 is used to calculate the pinion angle θp. The pinion absolute rotation angle θabp is detected, for example, as a positive value when the vehicle is steered rightward and as a negative value when the vehicle is steered leftward. In this embodiment, the pinion absolute angle sensor 45 is an example of the sensor that detects an actually measured value of the pinion angle θp.

A power source system 46 is connected to the steering control device 1. The power source system 46 has a battery 47. The battery 47 is a secondary battery installed in the vehicle, and serves as an electric power source of electric power that is supplied for the steering-side motor 13 and the turning-side motor 32 to operate. Further, the battery 47 serves as an electric power source of electric power that is supplied for the steering control device 1 to operate.

A start switch 48 ("SW" in FIG. 1) of the vehicle, such as an ignition switch, is provided between the steering control device 1 and the battery 47. Of two power supply lines L1, L2 connecting the steering control device 1 and the battery 47 to each other, the start switch 48 is provided at an intermediate point of the power supply line L2 that branches off from the power supply line L1. The start switch 48 is operated when starting various functions to operate a travel driving source of the vehicle, such as an engine, and allow the vehicle to operate. Conduction of the power supply line L2 is turned on and off through operation of the start switch 48. In this embodiment, the operation state of the steering device 2 is linked to the operation state of the vehicle. As for the power supply line L1, conduction of the power supply line L1 is basically always on, and is indirectly turned on and off as a function of the steering device 2 according to the operation state of the steering device 2. The operation state of the steering device 2 is linked to on and off states of conduction of the power supply lines L1, L2 that are supply states of electric power of the battery 47.

Functions of Steering Control Device

The steering control device 1 includes a central processing unit (hereinafter referred to as a "CPU") 49a and a memory 49b. The steering control device 1 executes various processes as the CPU 49a executes programs stored in the memory 49b on a predetermined arithmetic operation cycle. The CPU 49a and the memory 49b constitute a microcomputer that is a processing circuit. The memory 49b includes computer-readable media, such as a random-access memory (RAM) and a read-only memory (ROM). However, that various processes are realized by software is one example. The processing circuit belonging to the steering control device 1 may be configured such that at least some of the processes are realized by a hardware circuit, such as a logic circuit.

Figure 2:
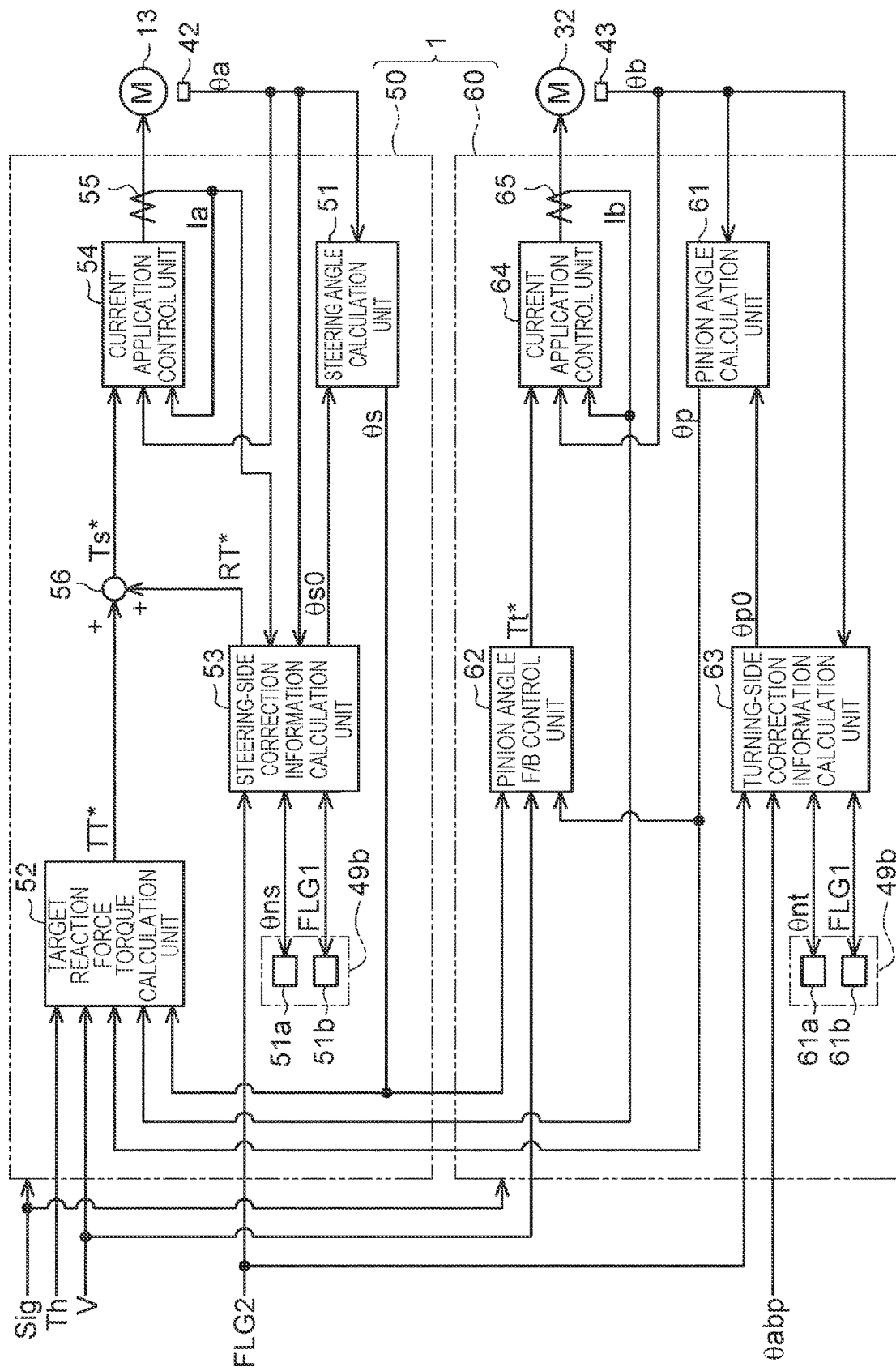
FIG. 2 is a block diagram showing processes executed by the steering control system of FIG. 1.

FIG. 2 shows some of the processes executed by the steering control device 1. The processes shown in FIG. 2 are some of the processes that are realized as the CPU 49a executes programs stored in the memory 49b, and these processes are depicted according to the kind of process to be realized.

The steering control device 1 has a steering-side control unit 50 and a turning-side control unit 60. The steering-side control unit 50 controls power supply to the steering-side motor 13. The steering-side control unit 50 has a steering-side current sensor 55. The steering-side current sensor 55 detects a steering-side actual current value Ia that is obtained from a value of a current in each phase of the steering-side motor 13 that flows through a connection line between the steering-side control unit 50 and a motor coil in each phase of the steering-side motor 13. The steering-side current sensor 55 acquires, as a current, a voltage drop of a shunt resistor that is connected to a source side of each switching element in an inverter (not shown) that is provided so as to correspond to the steering-side motor 13. In FIG. 2, for the convenience of description, the connection lines in the respective phases and the current sensors in the respective phases are collectively shown as one connection line and one current sensor. In this embodiment, the steering-side control unit 50 is one example of the control unit that controls the steering device 2 through control of the operation of the steering-side motor 13.

The turning-side control unit 60 controls power supply to the turning-side motor 32. The turning-side control unit 60 has a turning-side current sensor 65. The turning-side current sensor 65 detects a turning-side actual current value Ib that is obtained from a value of a current in each phase of the turning-side motor 32 that flows through a connection line between the turning-side control unit 60 and a motor coil in each phase of the turning-side motor 32. The turning-side current sensor 65 acquires, as a current, a voltage drop of a shunt resistor that is connected to a source side of each switching element in an inverter (not shown) that is provided so as to correspond to the turning-side motor 32. In FIG. 2, for the convenience of description, the connection lines in the respective phases and the current sensors in the respective phases are collectively shown as one connection line and one current sensor. In this embodiment, the turning-side control unit 60 is one example of the control unit that controls the steering device 2 through control of the operation of the turning-side motor 32.

Steering-Side Control Unit 50

As shown in FIG. 2, the steering torque Th, the vehicle speed V, the rotation angle θa, the turning-side actual current value Ib, the pinion angle θp, a start signal Sig, and battery replacement information FLG2 are input into the steering-side control unit 50. Based on the steering torque Th, the vehicle speed V, the rotation angle θa, the turning-side actual current value Ib, the pinion angle θp, the start signal Sig, and the battery replacement information FLG2, the steering-side control unit 50 controls power supply to the steering-side motor 13. The start signal Sig is a signal indicating an on or off state of the start switch 48. The battery replacement information FLG2 is information indicating whether the vehicle is in a state after the battery 47 belonging to the power source system 46 has been removed and replaced. In the case where the start switch 48 is switched to the on state after the battery 47 is removed and replaced, the power source system 46 sets a value "1" as the battery replacement information FLG2. The battery replacement information FLG2 of the value "1" indicates that the power source is started for the first time since battery replacement. In the case where the start switch 48 is switched to the on state without the battery 47 having been removed and replaced, the power source system 46 sets a value "0" as the battery replacement information FLG2. The battery replacement information FLG2 of the value "0" indicates that the power source is started not for the first time since battery replacement. The battery replacement information FLG2 thus obtained is output to the steering-side control unit 50 and the turning-side control unit 60 through dedicated signal lines.

The steering-side control unit 50 has a steering angle calculation unit 51, a target reaction force torque calculation unit 52, a steering-side correction information calculation unit 53, and a current application control unit 54. The rotation angle θa and a set steering angle θs0 are input into the steering angle calculation unit 51. Based on the set steering angle θs0, the steering angle calculation unit 51 converts the rotation angle θa into an integrated angle from steering-side midpoint information θns that is stored in a storage unit 51a. The integrated angle is a value converted to within a range exceeding 360°, by counting the number of revolutions of the steering-side motor 13 from the steering-side midpoint information θns. The set steering angle θs0 is calculated by the steering-side correction information calculation unit 53. The steering-side midpoint information θns is, for example, information indicating a steering neutral position that is the position of the steering wheel 3 when the vehicle is moving straight ahead. The storage unit 51a is a predetermined storage area of the memory 49b. The steering angle calculation unit 51 calculates the steering angle θs by multiplying the integrated angle, obtained by conversion, by a conversion factor based on a rotation speed ratio of the steering-side speed reduction mechanism 14. The steering angle calculation unit 51 calculates the steering angle θs as an absolute angle relative to the steering neutral position. The steering angle θs thus obtained is output to the target reaction force torque calculation unit 52 and the turning-side control unit 60.

The steering torque Th, the vehicle speed V, the turning-side actual current value Ib, the steering angle θs, and the pinion angle θp are input into the target reaction force torque calculation unit 52. Based on the steering torque Th, the vehicle speed V, the turning-side actual current value Ib, the steering angle θs, and the pinion angle θp, the target reaction force torque calculation unit 52 calculates a target reaction force torque TT*. The target reaction force torque TT* is a control amount serving as a target of a steering reaction force for the steering wheel 3 that should be generated through the steering-side motor 13. The target reaction force torque TT* thus obtained is output to an adder 56.

The rotation angle θa, the steering-side actual current value Ia, the steering-side midpoint information θns, abnormal condition information FLG1, and the battery replacement information FLG2 are input into the steering-side correction information calculation unit 53. Based on the rotation angle θa, the steering-side actual current value Ia, the steering-side midpoint information θns, the abnormal condition information FLG1, and the battery replacement information FLG2, the steering-side correction information calculation unit 53 calculates the steering-side midpoint information θns, the abnormal condition information FLG1, and the set steering angle θs0. The steering-side midpoint information θns thus obtained is written into the storage unit 51a. The abnormal condition information FLG1 is written into a storage unit 51b. The set steering angle θs0 is output to the steering angle calculation unit 51.

The steering-side midpoint information θns is information that the steering-side correction information calculation unit 53 sets in the storage unit 51a. The steering-side correction information calculation unit 53 includes a steering-side correction information storing process of acquiring steering-side correction element information θcs and further writing the steering-side midpoint information θns into the storage unit 51a. To acquire the steering-side correction element information θcs, the rotation angle θa obtained from the steering unit 4 is used. The steering-side midpoint information θns is obtained based on the acquired steering-side correction element information θcs. The steering-side correction information storing process includes a process of calculating the set steering angle θs0. The steering-side correction information storing process will be described in detail later.

The abnormal condition information FLG1 is information that the steering-side correction information calculation unit 53 sets in the storage unit 51b. The steering-side correction information storing process includes a process of setting the abnormal condition information FLG1 in the storage unit 51b. When the steering-side correction information calculation unit 53 has failed to complete writing of the steering-side midpoint information θns, it writes the abnormal condition information FLG1 of the value "1" into the storage unit 51b. In other words, the abnormal condition information FLG1 of the value "1" indicates that the steering-side midpoint information θns stored in the storage unit 51a cannot be normally used. When the steering-side correction information calculation unit 53 has successfully completed writing of the steering-side midpoint information θns, it writes the abnormal condition information FLG1 of the value "0" into the storage unit 51b. In other words, the abnormal condition information FLG1 of the value "0" indicates that the steering-side midpoint information θns stored in the storage unit 51a can be normally used. In the storage unit 51b, the abnormal condition information FLG1 of the value "0" is stored as an initial value. For example, when the contents of the storage unit 51b are cleared after battery replacement, the abnormal condition information FLG1 of the value "0" that is the initial value is stored therein. The storage unit 51b is a predetermined storage area of the memory 49b. The storage unit 51b is one of the storage areas of the memory 49b that is different from the storage unit 51a.

When acquiring the steering-side correction element information θcs through the steering-side correction information storing process, the steering-side correction information calculation unit 53 calculates a target rotation torque RT* based on the rotation angle θa and the steering-side actual current value Ia. The target rotation torque RT* is a control amount serving as a target of a rotation force for the steering wheel 3 that should be generated through the steering-side motor 13. The target rotation torque RT* thus obtained is output to the adder 56.

The target reaction force torque TT* and the target rotation torque RT* are input into the adder 56. The adder 56 calculates a steering-side motor torque command value Ts* by adding up the target reaction force torque TT* and the target rotation torque RT*. As the value of the target reaction force torque TT*, a value other than "0" is calculated when giving the driver an appropriate sense of resistance according to a road surface reaction force in the case where a normal process for turning the turning wheels 5 according to the driver's steering operation is executed. As the value of the target rotation torque RT*, a value other than "0" is calculated when applying a rotation torque for rotating the steering wheel 3 in the case where the steering-side correction information storing process for acquiring the steering-side correction element information θcs is executed. Thus, the steering-side motor torque command value Ts* is the target reaction force torque TT* in the case where the normal process is executed. The steering-side motor torque command value Ts* is the target rotation torque RT* in the case where the steering-side correction information storing process is executed. The steering-side motor torque command value Ts* thus obtained is output to the current application control unit 54.

The steering-side motor torque command value Ts*, the rotation angle θa, and the steering-side actual current value Ia are input into the current application control unit 54. Based on the steering-side motor torque command value Ts*, the current application control unit 54 calculates a current command value Ia* for the steering-side motor 13. The current application control unit 54 obtains a difference between the current command value Ia* and a current value in a dq coordinate system that is obtained by converting the steering-side actual current value Ia based on the rotation angle θa, and controls power supply to the steering-side motor 13 so as to eliminate this difference. As a result, the steering-side motor 13 generates a torque according to the steering-side motor torque command value Ts*.

Turning-Side Control Unit 60

As shown in FIG. 2, the vehicle speed V, the rotation angle θb, the pinion absolute rotation angle θabp, the steering angle θs, the start signal Sig, and the battery replacement information FLG2 are input into the turning-side control unit 60. Based on the vehicle speed V, the rotation angle θb, the pinion absolute rotation angle θabp, the steering angle θs, the start signal Sig, and the battery replacement information FLG2, the turning-side control unit 60 controls power supply to the turning-side motor 32.

The turning-side control unit 60 has a pinion angle calculation unit 61, a pinion angle feedback control unit ("PINION ANGLE F/B CONTROL UNIT" in FIG. 2) 62, a turning-side correction information calculation unit 63, and a current application control unit 64.

The rotation angle θb and the set pinion angle θp0 are input into the pinion angle calculation unit 61. Based on the set pinion angle θp0, the pinion angle calculation unit 61 converts the rotation angle θb into an integrated angle from turning-side midpoint information θnt that is stored in a storage unit 61a. The integrated angle is a value converted within a range exceeding 360°, by counting the number of revolutions of the turning-side motor 32 from the turning-side midpoint information θnt. The set pinion angle θp0 is calculated by the turning-side correction information calculation unit 63. The turning-side midpoint information θnt is, for example, information indicating a rack neutral position that is the position of the rack shaft 22 when the vehicle is moving straight ahead. The storage unit 61a is a predetermined storage area of the memory 49b. The pinion angle calculation unit 61 calculates the pinion angle θp that is the actual rotation angle of the pinion shaft 21 by multiplying the integrated angle, obtained by conversion, by a conversion factor based on a rotation speed ratio of the transmission mechanism 33, a lead of the conversion mechanism 34, and a rotation speed ratio of the rack-and-pinion mechanism 24. Thus, the pinion angle calculation unit 61 calculates the pinion angle θp as an absolute angle relative to the rack neutral position. The pinion angle θp thus obtained is output to the pinion angle feedback control unit 62 and the steering-side control unit 50.

The vehicle speed V, the steering angle θs, and the pinion angle θp are input into the pinion angle feedback control unit 62. The pinion angle feedback control unit 62 calculates a turning-side motor torque command value Tt* through feedback control of the pinion angle θp so as to adapt the pinion angle θp to the pinion target angle θp*. The pinion target angle θp* is calculated as an angle converted into the scale of the pinion angle θp taking into account a steering angle ratio that is a ratio between the steering angle θs and the pinion angle θp relative to the steering angle θs. The pinion angle feedback control unit 62 changes the steering angle ratio according to the vehicle speed V. For example, the pinion angle feedback control unit 62 changes the steering angle ratio such that the pinion angle θp changes in response to a change in the steering angle θs by a greater amount when the vehicle speed V is low than when it is high. Thus, in the calculation of the pinion target angle θp*, a conversion calculation is performed such that the positional relationship with the steering angle θs meets a predetermined correspondence relationship.

As the value of the turning-side motor torque command value Tt*, a value other than "0" is calculated when turning the turning wheels 5 in the case where the normal process for turning the turning wheels 5 according to the driver's steering operation is executed. As the value of the turning-side motor torque command value Tt*, a value "0" is calculated in the case where the turning-side correction information storing process for acquiring turning-side correction element information θct, to be described later, is executed. The turning-side motor torque command value Tt* thus obtained is output to the current application control unit 64.

The rotation angle θb, the turning-side midpoint information θnt, the pinion absolute rotation angle θabp, the abnormal condition information FLG1, and the battery replacement information FLG2 are input into the turning-side correction information calculation unit 63. Based on the rotation angle θb, the turning-side midpoint information θnt, the pinion absolute rotation angle θabp, the abnormal condition information FLG1, and the battery replacement information FLG2, the turning-side correction information calculation unit 63 calculates the turning-side midpoint information θnt, the abnormal condition information FLG1, and the set pinion angle θp0. The turning-side midpoint information θnt thus obtained is written into the storage unit 61a. The abnormal condition information FLG1 is written into the storage unit 61b. The set pinion angle θp0 is output to the pinion angle calculation unit 61.

The turning-side midpoint information θnt is information that the turning-side correction information calculation unit 63 sets in the storage unit 61a. The turning-side correction information calculation unit 63 includes a turning-side correction information storing process of acquiring the turning-side correction element information θct and further writing the turning-side midpoint information θnt into the storage unit 61a. To acquire the turning-side correction element information θct, the pinion absolute rotation angle θabp obtained from the turning unit 6 is used. The turning-side midpoint information θnt is obtained based on the acquired turning-side correction element information θct. The turning-side correction information storing process includes a process of calculating the set pinion angle θp0. The turning-side correction information storing process will be described in detail later.

The abnormal condition information FLG1 is information that the turning-side correction information calculation unit 63 sets in the storage unit 61b. The turning-side correction information storing process includes a process of setting the abnormal condition information FLG1 in the storage unit 61b. When the turning-side correction information calculation unit 63 has failed to complete writing of the turning-side midpoint information θnt, it writes the abnormal condition information FLG1 of the value "1" into the storage unit 61b. In other words, the abnormal condition information FLG1 of the value "1" indicates that the turning-side midpoint information θnt stored in the storage unit 61a cannot be normally used. When the turning-side correction information calculation unit 63 has successfully completed writing of the turning-side midpoint information θnt, it writes the abnormal condition information FLG1 of the value "0" into the storage unit 61b. In other words, the abnormal condition information FLG1 of the value "0" indicates that the turning-side midpoint information θnt stored in the storage unit 61a can be normally used. In the storage unit 61a, the abnormal condition information FLG1 of the value "0" is stored as an initial value. For example, when the contents of the storage unit 61a are cleared after battery replacement, the abnormal condition information FLG1 of the value "0" that is the initial value is stored therein. The storage unit 61b is a predetermined storage area of the memory 49b. The storage unit 61b is one of the storage areas of the memory 49b that is different from the storage unit 61a.

The turning-side motor torque command value Tt*, the rotation angle θb, and the turning-side actual current value Ib are input into the current application control unit 64. Based on the turning-side motor torque command value Tt*, the current application control unit 64 calculates a current command value Ib* for the turning-side motor 32. The current application control unit 64 obtains a difference between the current command value Ib* and a current value in a dq coordinate system that is obtained by converting the turning-side actual current value Ib based on the rotation angle θb, and controls power supply to the turning-side motor 32 so as to eliminate this difference. As a result, the turning-side motor 32 rotates by an angle according to the turning-side motor torque command value Tt* only.

Process Executed in Start-Up State

After the start switch 48 is turned on and the power source system 46 of the vehicle is started based on a request from the driver by switch operation etc., the steering control device 1 makes a state transition to a normal control state via a start-up state. After the start signal Sig is input, the steering-side control unit 50 makes a state transition to a start-up state to execute the steering-side correction information storing process. Similarly, after the start signal Sig is input, the turning-side control unit 60 makes a state transition to a start-up state to execute the turning-side correction information storing process. In the start-up state, the vehicle is stationary. Further, in the start-up state, the steering control device 1 is in a state of not executing the normal process for turning the turning wheels 5 according to the driver's steering operation. Therefore, during the period of the start-up state, the turning wheels 5 maintain a state at the time of start-up of the power source.

Figure 3:
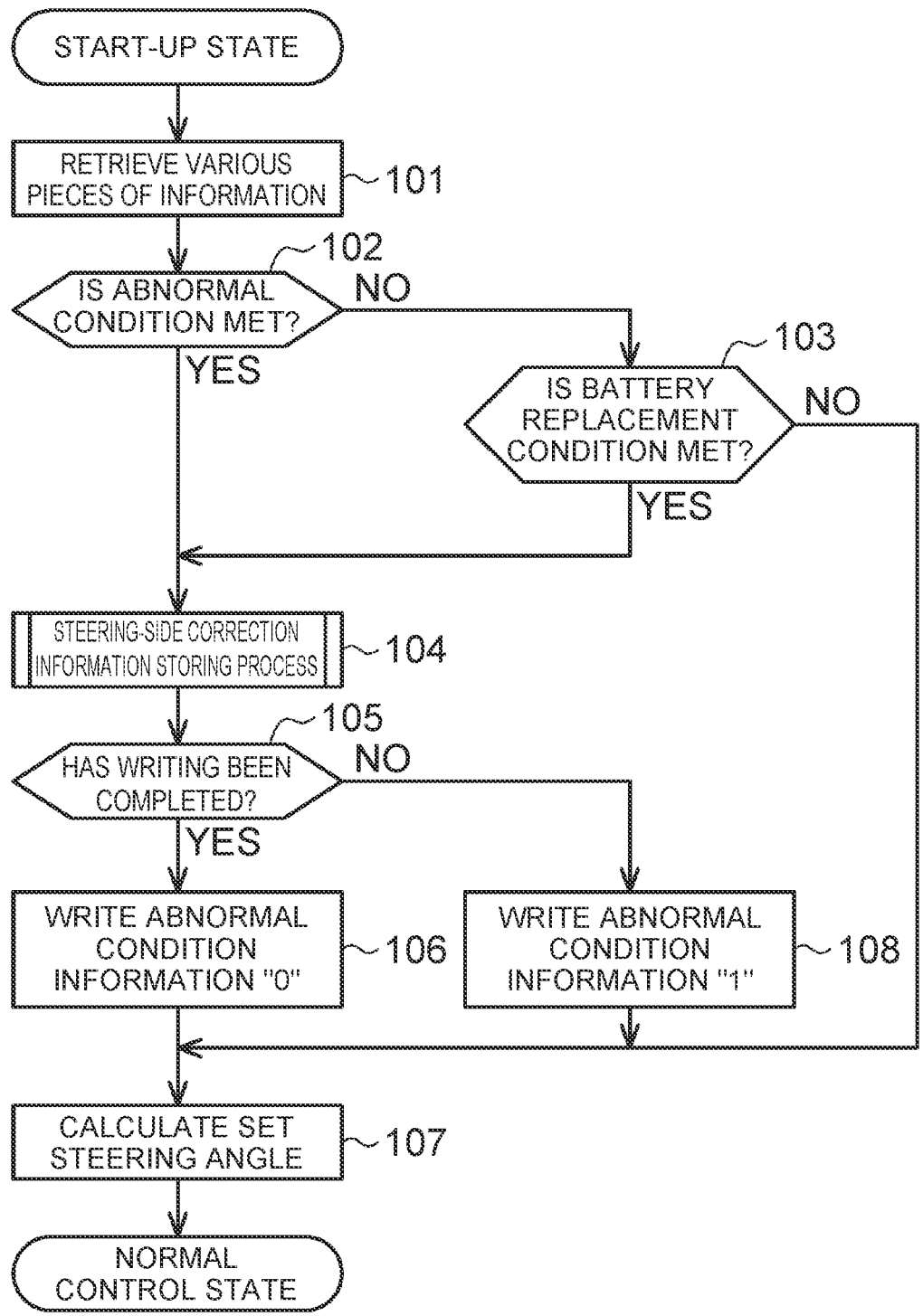
FIG. 3 is a flowchart showing the procedure of a process that the steering control system of FIG. 1 executes in a start-up state.

Next, one example of the processing procedure of a process that the steering-side control unit 50 executes in the start-up state through the steering-side correction information calculation unit 53 will be described in accordance with the flowchart shown in FIG. 3. As shown in FIG. 3, after the start signal Sig is input, the steering-side correction information calculation unit 53 retrieves various pieces of information from the memory 49b (step 101). In step 101, the steering-side correction information calculation unit 53 retrieves pieces of information including the steering-side midpoint information θns and the abnormal condition information FLG1. For example, the steering-side correction information calculation unit 53 retrieves the steering-side midpoint information θns from the storage unit 51a and retrieves the abnormal condition information FLG1 from the storage unit 51b.

Next, the steering-side correction information calculation unit 53 determines whether an abnormal condition is met (step 102). In step 102, the steering-side correction information calculation unit 53 determines whether writing of the steering-side midpoint information θns has been successfully completed based on whether the abnormal condition information FLG1 retrieved in step 101 is "0." In this embodiment, that writing of the steering-side midpoint information θns has failed to be completed is one example of the abnormal condition. The process of step 102 is one example of the abnormal condition determination process.

Next, when the steering-side correction information calculation unit 53 retrieves the abnormal condition information FLG1 of the value "1" and determines that the abnormal condition is met in step 102 (step 102: YES), it executes the steering-side correction information storing process (step 104). In step 104, the steering-side correction information calculation unit 53 acquires the steering-side correction element information θcs and further writes the steering-side midpoint information θns into the storage unit 51a through the steering-side correction information storing process. In this embodiment, the steering-side correction element information θcs is one example of the correction element information. The steering-side midpoint information θns is one example of the correction information.

On the other hand, when the steering-side correction information calculation unit 53 retrieves the abnormal condition information FLG1 of the value "0" and determines that the abnormal condition is not met (step 102: NO), it determines whether a battery replacement condition is met (step 103). When the battery replacement information FLG2 is not input in step 103, the steering-side correction information calculation unit 53 determines that the power source has been started for the first time since battery replacement. On the other hand, when the battery replacement information FLG2 is not input, the steering-side correction information calculation unit 53 determines that the power source has been started not for the first time since battery replacement. In this embodiment, that the power source is started for the first time since battery replacement is one example of the battery replacement condition. The process of step 103 is one example of the battery replacement condition determination process.

Of the contents of the memory 49b, rewritable contents are cleared and initialized in association with battery replacement. For example, the contents stored in the storage unit 51a and the storage unit 51b each correspond to rewritable contents and are cleared and initialized in association with battery replacement. Thus, by determining that the power source has been started for the first time since battery replacement in step 103, the steering-side correction information calculation unit 53 determines that the contents stored in the storage unit 51a and the storage unit 51b have been cleared and initialized. Conversely, by determining that the power source has been started not for the first time since battery replacement, the steering-side correction information calculation unit 53 determines that the contents stored in the storage unit 51a and the storage unit 51b have not been cleared and initialized.

Next, when the steering-side correction information calculation unit 53 determines that the battery replacement condition is met (step 103: YES), it executes the steering-side correction information storing process (step 104). In step 104 in this case, as in the case where the determination result of step 102 is YES, the steering-side correction information calculation unit 53 acquires the steering-side correction element information θcs and further writes the steering-side midpoint information θns into the storage unit 51a through the steering-side correction information storing process.

Next, the steering-side correction information calculation unit 53 determines whether writing of the steering-side midpoint information θns into the storage unit 51a through the steering-side correction information storing process executed in step 104 has been completed (step 105). In step 105, the steering-side correction information calculation unit 53 uses, for example, a verification function. The verification function is a function of retrieving the steering-side midpoint information θns that has been written into the storage unit 51a by the process of step 104 and determining whether the retrieved steering-side midpoint information θns matches the contents having been written by the process of step 104. Using the verification function, when the retrieved steering-side midpoint information θns matches the contents having been written by the process of step 104, the steering-side correction information calculation unit 53 determines that writing of the steering-side midpoint information θns into the storage unit 51a has been completed. On the other hand, using the verification function, when the retrieved steering-side midpoint information θns does not match the contents having been written by the process of step 104, the steering-side correction information calculation unit 53 determines that writing of the steering-side midpoint information θns into the storage unit 51a has failed to be completed.

Next, when the steering-side correction information calculation unit 53 determines that writing of the steering-side midpoint information θns into the storage unit 51a has been completed (step 105: YES), it writes the abnormal condition information FLG1 of the value "0" into the storage unit 51b (step 106).

Next, the steering-side correction information calculation unit 53 calculates the set steering angle θs0 (step 107), and sets completion of the process to be executed in the start-up state. In step 107 in this case, the steering-side correction information calculation unit 53 calculates the set steering angle θs0 that is obtained by correcting the rotation angle θa based on the steering-side midpoint information θns having been written by the process of step 104. The set steering angle θs0 is an absolute angle relative to the steering neutral position, and is used as the steering angle θs to be used when executing the normal process. After completion of the process to be executed in the start-up state is set, the steering-side control unit 50 makes a state transition to the normal control state where the steering-side control unit 50 executes the normal process for turning the turning wheels 5 according to the driver's steering operation. In this embodiment, the rotation angle θa is one example of the state variable obtained from the steering unit 4. The steering angle θs, i.e., the set steering angle θs0 is one example of the control variable for steering that is used when executing the normal process.

On the other hand, when the steering-side correction information calculation unit 53 determines in step 105 that writing of the steering-side midpoint information θns into the storage unit 51a has failed to be completed (step 105: NO), it writes the abnormal condition information FLG1 of the value "1" into the storage unit 51b (step 108). In this embodiment, the process of step 108 is one example of the abnormality information storing process.

Next, the steering-side correction information calculation unit 53 calculates the set steering angle θs0 (step 107) and sets completion of the process to be executed in the start-up state. In step 107 in this case, the steering-side correction information calculation unit 53 calculates the set steering angle θs0 that is obtained by correcting the rotation angle θa based on the steering-side midpoint information θns having been written by the process of step 104. Even when writing fails to be completed by the process of step 104 (step 105: NO), the value of the steering-side midpoint information θns itself has been determined to be a normal value. After completion of the process to be executed in the start-up state is set, the steering-side control unit 50 makes a state transition to the normal control state where the steering-side control unit 50 executes the normal process for turning the turning wheels 5 according to the driver's steering operation.

When the steering-side correction information calculation unit 53 determines that the battery replacement condition is not met in step 103 (step 103: NO), it calculates the set steering angle θs0 (step 107), and sets completion of the process to be executed in the start-up state. In step 107 in this case, the steering-side correction information calculation unit 53 calculates the set steering angle θs0 that is obtained by correcting the rotation angle θa based on the steering-side midpoint information θns having been retrieved by the process of step 101. When the determination result of step 103 is NO, the steering-side correction information calculation unit 53 does not execute the steering-side correction information storing process (step 104).

In the start-up state, the turning-side control unit 60 executes, through the turning-side correction information calculation unit 63, a process corresponding to the process that the steering-side correction information calculation unit 53 executes. For example, as a process corresponding to step 101, the turning-side correction information calculation unit 63 retrieves various pieces of information from the memory 49b after the start signal Sig is input. In this case, the turning-side correction information calculation unit 63 retrieves the turning-side midpoint information θnt from the storage unit 61a and retrieves the abnormal condition information FLG1 from the storage unit 61b.

Next, as a process corresponding to step 102, the turning-side correction information calculation unit 63 determines whether the abnormal condition is met. When the turning-side correction information calculation unit 63 retrieves the abnormal condition information FLG1 of the value "1" and determines that the abnormal condition is met, it executes the turning-side correction information storing process as a process corresponding to step 104.

On the other hand, when the turning-side correction information calculation unit 63 retrieves the abnormal condition information FLG1 of the value "0" and determines that the abnormal condition is not met, it determines whether the battery replacement condition is met as a process corresponding to step 103. When the turning-side correction information calculation unit 63 determines that the battery replacement condition is met, it executes the turning-side correction information storing process as a process corresponding to step 104.

Next, as a process corresponding to step 104, the turning-side correction information calculation unit 63 acquires the turning-side correction element information θct and further writes the turning-side midpoint information θnt into the storage unit 61a through the turning-side correction information storing process. In this embodiment, the turning-side correction element information θct is one example of the correction element information. The turning-side midpoint information θnt is one example of the correction information.

Next, as a process corresponding to step 105, the turning-side correction information calculation unit 63 determines whether writing of the turning-side midpoint information θnt into the storage unit 61a has been completed through the turning-side correction information storing process. In this case, like the steering-side correction information calculation unit 53, the turning-side correction information calculation unit 63 determines, using a verification function, whether writing of the turning-side midpoint information θnt into the storage unit 61a has been completed.

Next, when the turning-side correction information calculation unit 63 determines that writing of the turning-side midpoint information θnt into the storage unit 61a has been completed, it writes the abnormal condition information FLG1 of the value "0" into the storage unit 61b as a process corresponding to step 106. In this case, as a process corresponding to step 107, the turning-side correction information calculation unit 63 calculates the set pinion angle θp0 and sets completion of the process to be executed in the start-up state. The turning-side correction information calculation unit 63 calculates the set pinion angle θp0 that is obtained by correcting the rotation angle θb based on the turning-side midpoint information θnt having been written by the turning-side correction information storing process. The set pinion angle θp0 is an absolute angle relative to the rack neutral position and used as a pinion angle θp to be used when executing the normal process. After completion of the process to be executed in the start-up state is set, the turning-side control unit 60 makes a state transition to the normal control state where the turning-side control unit 60 executes the normal process for turning the turning wheels 5 according to the driver's steering operation. In this embodiment, the rotation angle θb is one example of the state variable that is obtained from the turning unit 6. The pinion angle θp, i.e., the set pinion angle θp0 is one example of the control variable for turning that is used when executing the normal process.

On the other hand, when the turning-side correction information calculation unit 63 determines that writing of the turning-side midpoint information θnt into the storage unit 61a has failed to be completed, it writes the abnormal condition information FLG1 of the value "1" into the storage unit 61b as a process corresponding to step 108. In this case, as a process corresponding to step 107, the turning-side correction information calculation unit 63 calculates the set pinion angle θp0 and sets completion of the process to be executed in the start-up state. The turning-side correction information calculation unit 63 calculates the set pinion angle θp0 that is obtained by correcting the rotation angle θb based on the turning-side midpoint information θnt having been written by the turning-side correction information storing process. Even when writing has failed to be completed by the turning-side correction information storing process, the value of the turning-side midpoint information θnt itself has been determined to be a normal value. After completion of the process to be executed in the start-up state is set, the turning-side control unit 60 makes a state transition to the normal control state where the turning-side control unit 60 executes the normal process for turning the turning wheels 5 according to the driver's steering operation.

When the turning-side correction information calculation unit 63 determines that the battery replacement condition is not met, it calculates the set pinion angle θp0 and sets completion of the process to be executed in the start-up state as a process corresponding to step 107. In this case, the turning-side correction information calculation unit 63 calculates the set pinion angle θp0 that is obtained by correcting the rotation angle θb based on the turning-side midpoint information θnt having been retrieved by the process corresponding to step 101. When the turning-side correction information calculation unit 63 determines that the battery replacement condition is not met, it does not execute the turning-side correction information storing process.

Steering-Side Correction Information Storing Process

Next, one example of the processing procedure of the steering-side correction information storing process that the steering-side control unit 50 executes through the steering-side correction information calculation unit 53 will be described in accordance with the flowchart shown in FIG. 4.

Figure 4:
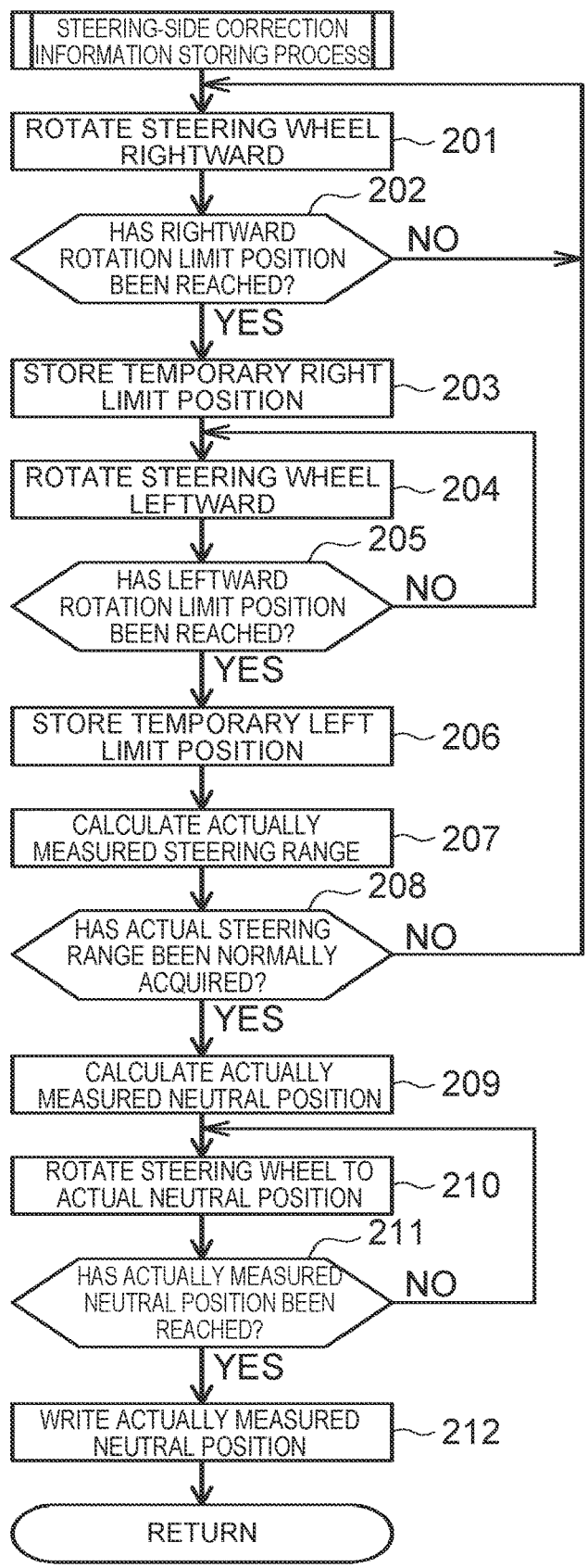
FIG. 4 is a flowchart showing the procedure of the steering-side correction information storing process of FIG. 3.

As shown in FIG. 4, the steering-side correction information calculation unit 53 rotates the steering wheel 3 rightward that is one of leftward and rightward directions (step 201). In step 201, the steering-side correction information calculation unit 53 calculates the target rotation torque RT* for rotating the steering wheel 3 rightward. For example, the steering-side correction information calculation unit 53 calculates the target rotation torque RT* through feedback control of a temporary steering angle θsi such that the temporary steering angle θsi adapts to the steering target angle θs*. The temporary steering angle θsi is an integrated angle that is obtained using the position of the rotation angle θa at the start-up of the power source as a temporary reference value. The steering target angle θs* is a value that is updated so as to change gradually from the value of the temporary steering angle θsi at the start of the steering-side correction information storing process to beyond the rightward rotation limit position 3a in the rotation range of the steering wheel 3.

Next, the steering-side correction information calculation unit 53 determines whether the steering wheel 3 has reached the rightward rotation limit position 3a (step 202). In step 202, for example, the steering-side correction information calculation unit 53 monitors the steering-side actual current value Ia. The steering-side actual current value Ia does not undergo a great change during a period until the steering wheel 3 reaches the rightward rotation limit position 3a. The absolute value of the steering-side actual current value Ia increases sharply when the steering wheel 3 reaches the rightward rotation limit position 3a. This is because rotation of the steering-side motor 13 is restricted as rotation of the steering shaft 11 is restricted through the stopper mechanism 11b. In this case, the target rotation torque RT* increases sharply and also the steering-side actual current value Ia increases sharply as the steering-side correction information calculation unit 53 tries to further rotate the steering-side motor 13 while rotation of the steering-side motor 13 is restricted. When the absolute value of the steering-side actual current value Ia is equal to or larger than a current threshold value Iath, the steering-side correction information calculation unit 53 determines that the steering wheel 3 has reached the rightward rotation limit position 3a. On the other hand, when the absolute value of the steering-side actual current value Ia is smaller than the current threshold value Iath, the steering-side correction information calculation unit 53 determines that the steering wheel 3 has not reached the rightward rotation limit position 3a. For example, the current threshold value Iath is set to a value within a range that is experimentally obtained such that rotation of the steering-side motor 13 is restricted as rotation of the steering shaft 11 is restricted through the stopper mechanism 11b.

Next, when the steering-side correction information calculation unit 53 determines that the steering wheel 3 has not reached the rightward rotation limit position 3a (step 202: NO), it repeatedly executes the processes of step 201 and step 202. On the other hand, when the steering-side correction information calculation unit 53 determines that the steering wheel 3 has reached the rightward rotation limit position 3a (step 202: YES), it temporarily stores a temporary right limit position θrl (step 203). In step 203, the steering-side correction information calculation unit 53 temporarily stores, as the temporary right limit position θrl, the temporary steering angle θsi of the time when it has been determined that the rightward rotation limit position 3a has been reached. In this embodiment, the temporary right limit position θrl that the steering-side correction information calculation unit 53 temporarily stores is one example of the steering-side correction element information θcs.

Next, the steering-side correction information calculation unit 53 rotates the steering wheel 3 leftward that is the other direction than the rightward direction (step 204). In step 204, the steering-side correction information calculation unit 53 calculates the target rotation torque RT* for rotating the steering wheel 3 leftward. For example, as in the process of step 201, the steering-side correction information calculation unit 53 calculates the target rotation torque RT* through feedback control of the temporary steering angle θsi such that the temporary steering angle θsi adapts to the steering target angle θs*. The steering target angle θs* is a value that is updated so as to change gradually from the value of the temporary steering angle θsi of the case where the rightward rotation limit position 3a has been reached to beyond the leftward rotation limit position 3b in the rotation range of the steering wheel 3.

Next, the steering-side correction information calculation unit 53 determines whether the steering wheel 3 has reached the leftward rotation limit position 3b (step 205). In step 205, for example, the steering-side correction information calculation unit 53 monitors the steering-side actual current value Ia as in the process of step 205.

Next, when the steering-side correction information calculation unit 53 determines that the steering wheel 3 has not reached the leftward rotation limit position 3b (step 205: NO), it repeatedly executes the processes of step 204 and step 205. On the other hand, when the steering-side correction information calculation unit 53 determines that the steering wheel 3 has reached the leftward rotation limit position 3b (step 205: YES), it temporarily stores a temporary left limit position θll (step 206). In step 206, the steering-side correction information calculation unit 53 temporarily stores, as the temporary left limit position θll, the temporary steering angle θsi of the time when it has been determined that the leftward rotation limit position 3b has been reached. In this embodiment, the temporary left limit position θll that the steering-side correction information calculation unit 53 temporarily stores is one example of the steering-side correction element information θcs.

Next, the steering-side correction information calculation unit 53 calculates an actually measured steering range SR that is the steering range of the steering wheel 3 (step 207). In step 207, the steering-side correction information calculation unit 53 calculates, as the actually measured steering range SR, the absolute value of the difference between the temporary right limit position θrl temporarily stored in step 203 and the temporary left limit position θll temporarily stored in step 206.

Next, the steering-side correction information calculation unit 53 determines whether the actually measured steering range SR has been normally acquired (step 208). In step 208, the steering-side correction information calculation unit 53 determines whether the absolute value of the difference between the actually measured steering range SR calculated in step 207 and a design value SRO is smaller than a steering range threshold value SRth. For example, if the driver hinders rotation of the steering wheel 3 by touching it etc. during execution of the process of step 201 or step 204, a normal value may fail to be stored as the temporary right limit position θrl or the temporary left limit position θll. In this case, the actually measured steering range SR may fail to be normally acquired. When the absolute value of the difference between the actually measured steering range SR and the design value SRO is equal to or larger than the steering range threshold value SRth, the steering-side correction information calculation unit 53 determines that the actually measured steering range SR has failed to be normally acquired. On the other hand, when the absolute value of the difference between the actually measured steering range SR and the design value SRO is smaller than the steering range threshold value SRth, the steering-side correction information calculation unit 53 determines that the actually measured steering range SR has been normally acquired. For example, the design value SRO is set as a value that defines the steering range of the steering wheel 3, individually for each vehicle in which the steering device 2 is installed. The steering range threshold value SRth is set to a value within a range that is obtained, with a tolerance factored in, as such a range that the actually measured steering range SR can be determined not to deviate from the design value SRO of the steering range of the steering wheel 3.

Next, when the steering-side correction information calculation unit 53 determines that the actually measured steering range SR has failed to be normally acquired (step 208: NO), it repeatedly executes the processes of steps 201 to 208. When the determination result of step 208 is NO, since the steering-side correction information storing process has failed to end normally, the steering-side correction information calculation unit 53 may set non-completion of the process to be executed in the start-up state. In this case, after non-completion of the process to be executed in the start-up state is set, the steering-side control unit 50 may make a state transition to a failure state, for example.

On the other hand, when the steering-side correction information calculation unit 53 determines that the actually measured steering range SR has been normally acquired (step 208: YES), it calculates an actually measured neutral position (step 209). In step 209, the steering-side correction information calculation unit 53 calculates, as the actually measured neutral position, a value corresponding to a midpoint between the temporary right limit position θrl temporarily stored in step 203 and the temporary left limit position θll temporarily stored in step 206. The absolute value of the difference between the actually measured neutral position and the temporary right limit position θrl and the absolute value of the difference between the actually measured neutral position and the temporary left limit position θll are equal to each other.

Next, the steering-side correction information calculation unit 53 rotates the steering wheel 3 to the actually measured neutral position (step 210). In step 210, the steering-side correction information calculation unit 53 calculates the target rotation torque RT* for rotating the steering wheel 3 to the actually measured neutral position calculated in step 209. For example, the steering-side correction information calculation unit 53 calculates the target rotation torque RT* through feedback control of the temporary steering angle θsi such that the temporary steering angle θsi adapts to the steering target angle θs*. The steering target angle θs* is a value that is updated so as to change gradually to a value indicating the actually measured neutral position from the value of the temporary steering angle θsi of the case where the leftward rotation limit position 3b has been reached in the rotation range of the steering wheel 3.

Next, the steering-side correction information calculation unit 53 determines whether the steering wheel 3 has reached the actually measured neutral position (step 211). In step 211, for example, the steering-side correction information calculation unit 53 monitors the temporary steering angle θsi. When the temporary steering angle θsi matches the actually measured neutral position, the steering-side correction information calculation unit 53 determines that the steering wheel 3 has reached the actually measured neutral position. On the other hand, when the temporary steering angle θsi does not match the actually measured neutral position, the steering-side correction information calculation unit 53 determines that the steering wheel 3 has not reached the actually measured neutral position.

Next, when the steering-side correction information calculation unit 53 determines that the steering wheel 3 has not reached the actually measured neutral position (step 211: NO), it repeatedly executes the processes of step 210 and step 211. On the other hand, when the steering-side correction information calculation unit 53 determines that the steering wheel 3 has reached the actually measured neutral position (step 211: YES), it writes the actually measured neutral position into the storage unit 51a (step 212). In step 212, the steering-side correction information calculation unit 53 writes the temporary steering angle θsi corresponding to the actually measured neutral position calculated in step 209 as the steering-side midpoint information θns into the storage unit 51a. Then, the steering-side correction information calculation unit 53 ends the steering-side correction information storing process and returns to the process of FIG. 3 to execute the processes of step 105 and the subsequent steps.

Motion of Steering Wheel

FIG. 5A illustrates a case where the initial position of the steering wheel 3 at the start of execution of the steering-side correction information storing process is the steering neutral position ("0" in FIG. 5A).

For example, as shown in FIG. 5A, when execution of the steering-side correction information storing process is started, the steering wheel 3 starts to rotate rightward. In this case, as shown in FIG. 5G, during the period up to time t1, the temporary steering angle θsi changes gradually from "0" toward the positive value side ("θsi (+)" in FIG. 5G) following the steering target angle θs* that is updated beyond the rightward rotation limit position 3a. In FIG. 5G, the solid line shows changes in the temporary steering angle θsi, and the long dashed short dashed line shows changes in the steering target angle θs*.

Next, as shown in FIG. 5B, when the steering wheel 3 reaches the rightward rotation limit position 3a, the rotation stops. In this case, as shown in FIG. 5G, when time t1 is reached, the temporary steering angle θsi assumes a value corresponding to the rightward rotation limit position 3a and does not change after that. The steering target angle θs* continues to change even after the temporary steering angle θsi has stopped changing. Thereafter, as shown in FIG. 5G, when time t2 at which the absolute value of the steering-side actual current value Ia becomes equal to or larger than the current threshold value Iath is reached, a first value θsi1 that is the value of the temporary steering angle θsi at that time is temporarily stored as the temporary right limit position θrl, i.e., the steering-side correction element information θcs.

Next, as shown in FIG. 5C, the steering wheel 3 starts to rotate leftward. In this case, as shown in FIG. 5G, during the period up to time t3, the temporary steering angle θsi changes gradually from "0" toward the negative value side ("θsi (−)" in FIG. 5G) following the steering target angle θs* that is updated beyond the leftward rotation limit position 3b.

Next, as shown in FIG. 5D, when the steering wheel 3 reaches the leftward rotation limit position 3b, the rotation stops. In this case, as shown in FIG. 5G, when time t3 is reached, the temporary steering angle θsi assumes a value corresponding to the leftward rotation limit position 3b and does not change after that. The steering target angle θs* continues to change even after the temporary steering angle θsi has stopped changing. Thereafter, as shown in FIG. 5G, when time t4 at which the absolute value of the steering-side actual current value Ia becomes equal to or larger than the current threshold value Iath is reached, a second value θsi2 that is the value of the temporary steering angle θsi at that time is temporarily stored as the temporary left limit position θll, i.e., the steering-side correction element information θcs.

Next, as shown in FIG. 5E, the steering wheel 3 starts rotating to the actually measured neutral position ("0" in FIG. 5E). In this case, as shown in FIG. 5G, during the period up to time t5, the temporary steering angle θsi increases gradually from the second value θsi2 toward "0" following the steering target angle θs* that is updated as the value indicating the actually measured neutral position.

Next, as shown in FIG. 5F, when the steering wheel 3 reaches the actually measured neutral position, the rotation stops. In this case, as shown in FIG. 5G, when time t5 is reached, the temporary steering angle θsi assumes a value corresponding to the actually measured neutral position and does not change after that. The steering target angle θs* has already stopped changing before the temporary steering angle θsi assumes a value corresponding to the actually measured neutral position. Thereafter, the value corresponding to the actually measured neutral position is written into the storage unit 51a as the steering-side midpoint information θns, and thereby the steering-side correction information storing process is ended.

Turning-Side Correction Information Storing Process

Next, one example of the processing procedure of the turning-side correction information storing process that the turning-side control unit 60 executes through the turning-side correction information calculation unit 63 will be described in accordance with the flowchart shown in FIG. 6. In this embodiment, the turning-side control unit 60 does not operate the turning unit 6 in association with execution of the turning-side correction information storing process. Therefore, the turning wheels 5 are not turned during execution of the turning-side correction information storing process.

Figure 6:
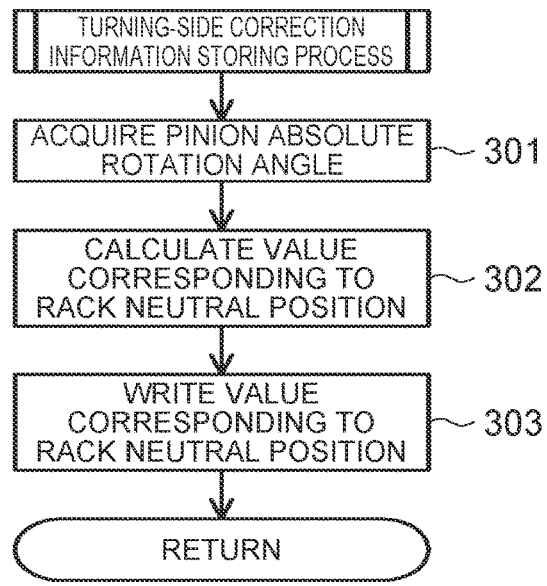
FIG. 6 is a flowchart showing the procedure of a turning-side correction information storing process.

As shown in FIG. 6, the turning-side correction information calculation unit 63 acquires the pinion absolute rotation angle θabp (step 301) and calculates a value corresponding to the rack neutral position (step 302). In step 302, the turning-side correction information calculation unit 63 calculates the turning-side correction element information θct that is the number of revolutions corresponding to the pinion absolute rotation angle θabp. Further, the turning-side correction information calculation unit 63 calculates a value corresponding to the rack neutral position for the pinion angle θp that is obtained by correcting the rotation angle θb based on the turning-side correction element information θct.

Next, the turning-side correction information calculation unit 63 writes the value corresponding to the rack neutral position into the storage unit 61a (step 303). In step 303, the turning-side correction information calculation unit 63 writes the value corresponding to the rack neutral position calculated in step 302 into the storage unit 61a as the turning-side midpoint information θnt. Then, the turning-side correction information calculation unit 63 ends the turning-side correction information storing process and returns to the process corresponding to FIG. 3 to execute the process corresponding to step 105 and the subsequent processes.

Workings and Advantages of First Embodiment

For example, even when the steering-side correction information storing process has already been executed after battery replacement, the determination result of step 102 can be YES if, during that execution, writing of the steering-side midpoint information θns into the storage unit 51a fails to be completed. In this case, when the power source is started after that, the steering-side midpoint information θns stored in the storage unit 51a cannot be used. That is, the steering angle θs deviates from the actual state of the steering unit 4.

Therefore, when the steering-side control unit 50 determines, in the start-up state, that the abnormal condition information FLG1 of the value "1" is stored in the storage unit 51b through processing by the steering-side correction information calculation unit 53 (step 102: YES), the steering-side control unit 50 executes the steering-side correction information storing process once again (re-executes the steering-side correction information storing process). Thus, even when the steering-side control unit 50 cannot use the steering-side midpoint information θns stored in the storage unit 51a at the current start-up of the power source, it can use the correct steering-side midpoint information θns by executing the steering-side correction information storing process once again. By executing the steering-side correction information storing process once again, the steering-side control unit 50 can complete writing of the steering-side midpoint information θns into the storage unit 51b. In this case, the steering-side control unit 50 can use the steering-side midpoint information θns stored in the storage unit 51a at the next and subsequent start-up of the power source. Thus, the steering-side control unit 50 can create a situation where the rotation angle θa can be corrected based on the steering-side midpoint information θns.

The above description also applies to the turning-side control unit 60. Specifically, when the turning-side control unit 60 determines, in the start-up state, that the abnormal condition information FLG1 of the value "1" is stored in the storage unit 61b through processing by the turning-side correction information calculation unit 63, the turning-side control unit 60 executes the turning-side correction information storing process once again. Thus, even when the turning-side control unit 60 cannot use the turning-side midpoint information θnt stored in the storage unit 61a at the current start-up of the power source, it can use the correct turning-side midpoint information θnt by executing the turning-side correction information storing process once again. By executing the turning-side correction information storing process once again, the turning-side control unit 60 can complete writing of the turning-side midpoint information θnt into the storage unit 61b. In this case, the turning-side control unit 60 can use the turning-side midpoint information θnt stored in the storage unit 61a at the next and subsequent start-up of the power source. Thus, the turning-side control unit 60 can create a situation where the rotation angle θb can be corrected based on the turning-side midpoint information θnt.

Therefore, the control variables including the steering angle θs and the pinion angle θp are less likely to deviate from the actual state of the steering device 2. The embodiment having been described above can further produce the workings and advantages described below.

(1-1) The steering-side control unit 50 is configured to store the abnormal condition information FLG1 of the value "1" into the storage unit 51b when, in the start-up state, writing of the steering-side midpoint information θns into the storage unit 51a has failed to be completed. The process of determining whether the abnormal condition information FLG1 of the value "1" is stored in the storage unit 51b, i.e., whether the abnormal condition is met, is executed before the steering-side correction information storing process. Thus, even when writing of the steering-side midpoint information θns into the storage unit 51a fails to be completed, the steering-side correction information storing process can be executed once again when the power source of the vehicle is started next time. Therefore, the steering-side control unit 50 can correct the rotation angle θa based on the correct steering-side midpoint information θns. The same also applies to the turning-side control unit 60. Specifically, even when writing of the turning-side midpoint information θnt into the storage unit 61a fails to be completed, the turning-side correction information storing process can be executed once again when the power source of the vehicle is started next time. Therefore, the turning-side control unit 60 can correct the rotation angle θb based on the correct turning-side midpoint information θnt.

(1-2) The steering-side control unit 50 is configured to determine, in the start-up state, whether the battery replacement condition is met. Further, the steering-side control unit 50 is configured to execute the steering-side correction information storing process when the battery replacement condition is met. The steering-side control unit 50 is configured to determine whether the abnormal condition is met before the process of determining whether the battery replacement condition is met. Thus, even when the battery replacement condition is not met and therefore the steering-side correction information storing process need not be executed, the steering-side correction information storing process is executed when the abnormal condition is met. In the start-up state, the steering-side control unit 50 can appropriately respond to an abnormality in the storage unit 51a relating to the steering-side midpoint information θns that has been written into the storage unit 51a through the steering-side correction information storing process. Thus, the reliability of the accuracy of the steering-side midpoint information θns can be increased. The same also applies to the turning-side control unit 60. Specifically, in the start-up state, the turning-side control unit 60 can appropriately respond to an abnormality in the storage unit 61*a* relating to the turning-side midpoint information θnt that has been written into the storage unit 61*a* through the turning-side correction information storing process. Thus, the reliability of the accuracy of the turning-side midpoint information θnt can be increased.

(1-3) When an abnormality relating to the midpoint information θns, θnt respectively written into the storage units 51*a*, 61*a* for the steering unit 4 and the turning unit 6 as targets occurs, the steering control device 1 can execute the correction information acquisition process for each unit once again. Thus, the steering control device 1 can correct the rotation angles θa, θb relating respectively to the steering unit 4 and the turning unit 6. Therefore, the steering angle θs and the pinion angle θp used to control the steering unit 4 and the turning unit 6, respectively, are less likely to deviate from the actual states of these units.

(1-4) In the steering-side correction information storing process, the steering-side midpoint information θns corresponding to the actual state of the steering unit 4 can be written into the storage unit 51*a*. Thus, the steering-side midpoint information θns assumes a value reflecting the actual state of the steering unit 4. This is effective for appropriately calculating the steering angle θs that is an important parameter for controlling the steering-side motor 13.

(1-5) In the start-up state, instead of acquiring the turning-side midpoint information θnt stored in the storage unit 61*a*, the turning-side control unit 60 can calculate the set pinion angle θp0 using the pinion absolute rotation angle θabp obtained from the pinion absolute angle sensor 45. However, the time taken to calculate the set pinion angle θp0 is shorter when acquiring the turning-side midpoint information θnt stored in the storage unit 61*a* than when acquiring the pinion absolute rotation angle θabp from the pinion absolute angle sensor 45 through a dedicated signal line. This is effective for shortening the time taken to make a state transition to the normal control state after start-up of the power source.

Second Embodiment

Next, a second embodiment of this disclosure will be described. For the convenience of description, the same components as in the first embodiment are denoted by the same reference signs as in the first embodiment and description thereof will be omitted.

The various sensors connected to the steering control device 1 according to this embodiment include a steering absolute angle sensor 70. As indicated by the long dashed double-short dashed line in FIG. 1, the steering absolute angle sensor 70 detects a steering absolute rotation angle θabs that is an actually measured value of the angle of a rotational axis of the steering shaft 11 within a range exceeding 360°. Specifically, the steering absolute angle sensor 70 is provided on the steering shaft 11. For example, the steering absolute angle sensor 70 is provided on the steering shaft 11, between the steering wheel 3 and the torque sensor 41. The steering absolute rotation angle θabs of the steering shaft 11 is used to calculate the steering angle θs. The steering absolute rotation angle θabs is detected, for example, as a positive value when the vehicle is steered rightward and as a negative value when the vehicle is steered leftward. In this embodiment, the steering absolute angle sensor 70 is one example of the sensor that detects the actually measured value of the steering angle θs.

Instead of the abnormal condition information FLG1, the steering absolute rotation angle θabs is input into the steering-side correction information calculation unit 53 according to this embodiment.

Process Executed in Start-Up State

Next, one example of the processing procedure of a process that the steering-side control unit 50 executes in the start-up state through the steering-side correction information calculation unit 53 will be described in accordance with the flowchart shown in FIG. 7.

Figure 7:
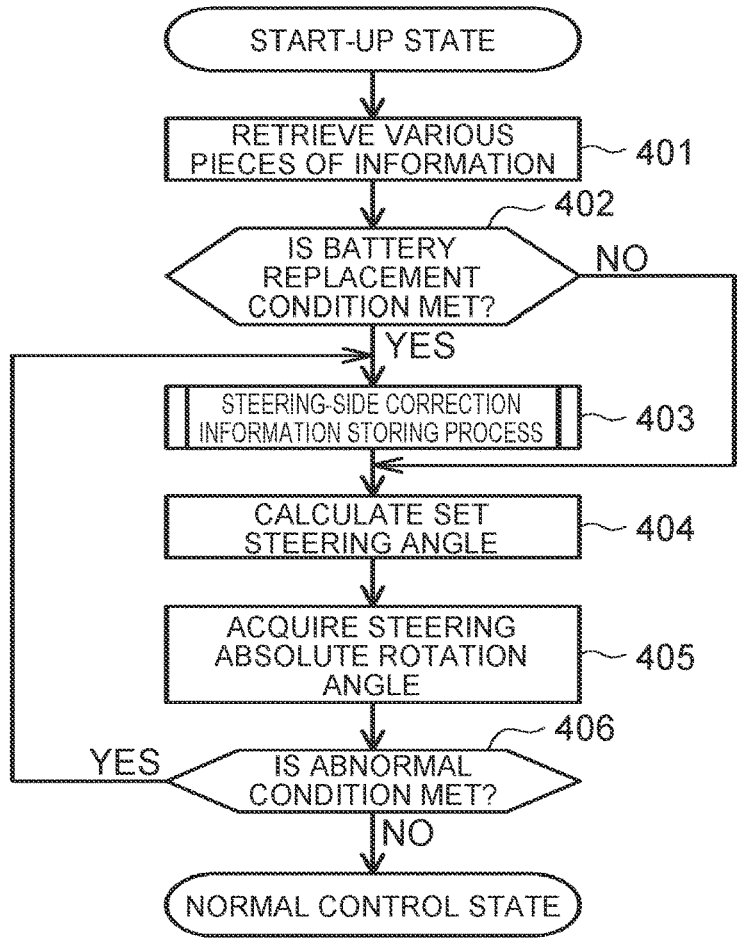
FIG. 7 is a flowchart showing the procedure of a process that a steering control system according to a second embodiment executes in a start-up state.

As shown in FIG. 7, after the start signal Sig is input, the steering-side correction information calculation unit 53 retrieves various pieces of information from the memory 49*b* (step 401). In step 401, the steering-side correction information calculation unit 53 retrieves pieces of information including the steering-side midpoint information θns. For example, the steering-side correction information calculation unit 53 retrieves the steering-side midpoint information θns from the storage unit 51*a*.

Next, the steering-side correction information calculation unit 53 determines whether the battery replacement condition is met (step 402). When the steering-side correction information calculation unit 53 determines that the battery replacement condition is met (step 402: YES), it executes the steering-side correction information storing process (step 403) and calculates the set steering angle θs0 (step 404). On the other hand, when the steering-side correction information calculation unit 53 determines that the battery replacement condition is not met (step 402: NO), it calculates the set steering angle θs0 (step 404). When the determination result of step 402 is NO, the steering-side correction information calculation unit 53 does not execute the steering-side correction information storing process (step 403).

Next, the steering-side correction information calculation unit 53 acquires the steering absolute rotation angle θabs (step 405) and determines whether an abnormal condition is met (step 406). In step 406, the steering-side correction information calculation unit 53 determines whether the abnormal condition is met, for example, based on a result of comparing the set steering angle θs0 calculated by the process of step 404 and the steering absolute rotation angle θabs acquired by the process of step 405. The steering-side correction information calculation unit 53 determines whether the absolute value of the difference between the set steering angle θs0 and the steering absolute rotation angle θabs is smaller than a steering-side threshold value θths. For example, if the steering-side midpoint information θns is not a normal value, discrepancy occurs between the set steering angle θs0 and the steering absolute rotation angle θabs. In this case, the steering-side midpoint information θns may have failed to be normally acquired. When the absolute value of the difference between the set steering angle θs0 and the steering absolute rotation angle θabs is equal to or larger than the steering-side threshold value θths, the steering-side correction information calculation unit 53 determines that the steering-side midpoint information θns has failed to be normally acquired. When the absolute value of the difference between the set steering angle θs0 and the steering absolute rotation angle θabs is smaller than the steering-side threshold value θths, the steering-side correction information calculation unit 53 determines that the steering-side midpoint information θns has been normally acquired. For example, the steering-side threshold value θths is set to a value within a range that is obtained, with a tolerance factored in, as such a range that it can be determined that there is no discrepancy between the set steering angle θs0 and the steering absolute rotation angle θabs. In this embodiment, that the steering-side midpoint information θns has failed to be normally acquired is one example of the abnormal condition. The process of step 102 is one example of the abnormal condition determination process.

Next, when the steering-side correction information calculation unit 53 determines that the abnormal condition is met (step 406: YES), it returns to the process of step 403 and executes the steering-side correction information storing process (step 403) and the subsequent processes once again.

On the other hand, when the steering-side correction information calculation unit 53 determines that the abnormal condition is not met (step 406: NO), it sets completion of the process to be executed in the start-up state. After completion of the process to be executed in the start-up state is set, the steering-side control unit 50 makes a state transition to the normal control state where the steering-side control unit 50 executes the normal process for turning the turning wheels 5 according to the driver's steering operation.

The turning-side control unit 60 executes a process in the start-up state through the turning-side correction information calculation unit 63 by a processing procedure corresponding to that of the steering-side correction information calculation unit 53. For example, as a process corresponding to step 401, the turning-side correction information calculation unit 63 retrieves various pieces of information from the memory 49b after the start signal Sig is input. In this case, the turning-side correction information calculation unit 63 retrieves the turning-side midpoint information θnt from the storage unit 61a.

Next, as a process corresponding to step 402, the turning-side correction information calculation unit 63 determines whether the battery replacement condition is met. When the turning-side correction information calculation unit 63 determines that the battery replacement condition is met, it executes the turning-side correction information storing process as a process corresponding to step 403 and calculates the set pinion angle θp0 as a process corresponding to step 404. On the other hand, when the turning-side correction information calculation unit 63 determines that the battery replacement condition is not met, the turning-side correction information calculation unit 63 calculates the set pinion angle θp0 as a process corresponding to step 404. When the turning-side correction information calculation unit 63 determines that the battery replacement condition is not met, it does not execute the turning-side correction information storing process.

Next, as processes corresponding to step 405 and step 406, the turning-side correction information calculation unit 63 acquires the pinion absolute rotation angle θabp and determines whether the abnormal condition is met. In this case, the turning-side correction information calculation unit 63 determines whether the abnormal condition is met based on, for example, a result of comparing the set pinion angle θp0 calculated in the process corresponding to step 404 and the pinion absolute rotation angle θabp acquired in the process corresponding to step 405. The turning-side correction information calculation unit 63 determines whether the absolute value of the difference between the set pinion angle θp0 and the pinion absolute rotation angle θabp is smaller than a turning-side threshold value θtht. For example, if the turning-side midpoint information θnt is not a normal value, discrepancy occurs between the set pinion angle θp0 and the pinion absolute rotation angle θabp. In this case, the turning-side midpoint information θnt may have failed to be normally acquired. When the absolute value of the difference between the set pinion angle θp0 and the pinion absolute rotation angle θabp is equal to or larger than the turning-side threshold value θtht, the turning-side correction information calculation unit 63 determines that the turning-side midpoint information θnt has failed to be normally acquired. When the absolute value of the difference between the set pinion angle θp0 and the pinion absolute rotation angle θabp is smaller than the turning-side threshold value θtht, the turning-side correction information calculation unit 63 determines that the turning-side midpoint information θnt has been normally acquired. For example, the turning-side threshold value θtht is set to a value within a range that is obtained, with a tolerance factored in, as such a range that it can be determined that there is no discrepancy between the set pinion angle θp0 and the pinion absolute rotation angle θabp.

Next, when the turning-side correction information calculation unit 63 determines that the abnormal condition is met, it returns to the process corresponding to step 403 and executes the turning-side correction information storing process and the subsequent processes once again.

On the other hand, when the turning-side correction information calculation unit 63 determines that the abnormal condition is not met, it sets completion of the process to be executed in the start-up state. After completion of the process to be executed in the start-up state is set, the turning-side control unit 60 makes a state transition to the normal control state where the turning-side control unit 60 executes the normal process for turning the turning wheels 5 according to the driver's steering operation.

The second embodiment having been described above can produce workings and advantages equivalent to those of the first embodiment, as well as can produce advantages equivalent to (1-3) to (1-5) of the first embodiment. In addition, the second embodiment can further produce the workings and advantages described below.

(2-1) The steering device 2 includes the steering absolute angle sensor 70. The process of step 406 includes a process of determining whether the abnormal condition is met based on a result of comparing the set steering angle θs0 and the steering absolute rotation angle θabs. The process of determining whether the abnormal condition is met based on a result of comparing the set steering angle θs0 and the steering absolute rotation angle θabs is executed after the steering-side correction information storing process. Thus, even when the steering-side midpoint information θns obtained through the steering-side correction information storing process executed during the period of the start-up state is itself not a normal value, the steering-side correction information storing process can be executed once again during the same period of the start-up state. Therefore, the steering-side control unit 50 can correct the rotation angle θa based on the correct steering-side midpoint information θns. The same also applies to the turning-side control unit 60. Specifically, even when the turning-side midpoint information θnt itself is not a normal value, the turning-side correction information storing process can be executed once again during the same period of the start-up state. Therefore, the turning-side control unit 60 can correct the rotation angle θb based on the correct turning-side midpoint information θnt.

OTHER EMBODIMENTS

Each of the above-described embodiments may be changed as follows. The following other embodiments can be combined with one another within such a range that no technical inconsistency arises.

In the above-described first embodiment, the steering-side control unit 50 may execute a process of determining whether the power source has been started for the first time since battery replacement from the contents of the memory 49b and internally setting information corresponding to the battery replacement information FLG2. In this case, the process of step 103 of FIG. 3 should be a process of retrieving the information corresponding to the battery replacement information FLG2 and determining whether the battery replacement condition is met. The process of FIG. 3 should include, instead of the process of step 108, a process of, when the determination result of step 105 is NO, maintaining such contents of the information corresponding to the battery replacement information FLG2 that the battery replacement condition can be met. Thus, the process of step 102 can be omitted from the process of FIG. 3. On the other hand, in the process of FIG. 3, the process of step 103 corresponds to the abnormal condition determination process. The other embodiment described here can also be applied to the turning-side control unit 60.

In the above-described first embodiment, in the process of FIG. 3, processes corresponding to step 405 and step 406 of the second embodiment may be added after the process of step 107. In this case, as in the above-described second embodiment, the steering device 2 should be provided with the steering absolute angle sensor 70. The other embodiment described here can offer the workings and advantages described in the first embodiment and the second embodiment.

The above-described first embodiment should be applied, for example, at least to the steering-side control unit 50. In this case, the second embodiment should be applied to the turning-side control unit 60. The turning-side control unit 60 may be configured to calculate the set pinion angle θp0, each time the power source is started, by acquiring the pinion absolute rotation angle θabp and calculating a value corresponding to the rack neutral position.

The above-described second embodiment should be applied, for example, at least to the turning-side control unit 60. In this case, the first embodiment should be applied to the steering-side control unit 50.

In each of the above-described embodiments, the steering-side control unit 50 and the turning-side control unit 60 may execute, after setting the set steering angle θs0 and the set pinion angle θp0, a synchronization process of synchronizing the steering wheel 3 and the turning wheels 5 such that the positional relationship of their positions meets a predetermined correspondence relationship. In this case, the steering-side control unit 50 and the turning-side control unit 60 should be configured to set completion of the process to be executed in the start-up state after completion of this synchronization process.

In each of the above-described embodiments, the processing procedure of the steering-side correction information storing process is not limited to the procedure shown in FIG. 4 but can be changed as appropriate. For example, the order of processing may be changed such that steps 201 to 203 shown in FIG. 4 are executed after processing of steps 204 to 206.

In each of the above-described embodiments, the processes of step 210 and step 211 may be omitted from the processing of the steering-side correction information storing process, i.e., the process of FIG. 4. The processes of step 210 and step 211 may be processes of rotating the steering wheel 3 to the temporary right limit position θrl or the temporary left limit position θll. That is, the processes of step 210 and step 211 should be processes for allowing the position of the steering wheel 3 to reach a predefined position after execution of the steering-side correction information storing process.

In each of the above-described embodiments, it is not essential that the target reaction force torque calculation unit 52 calculates the target reaction force torque TT* using the steering torque Th, the vehicle speed V, the turning-side actual current value Ib, the steering angle θs, and the pinion angle θp as inputs. For example, the target reaction force torque TT* may be calculated using the steering torque Th and the vehicle speed V as inputs.

In each of the above-described embodiments, the process executed by the pinion angle calculation unit 61 may be a process of converting a detected value of the amount of movement of the rack shaft 22 into the pinion angle θp. In this case, with regards to the above-described embodiments, the control amount relating to the pinion angle θp etc. are converted by the detected value of the amount of movement of the rack shaft 22. In the other embodiment described here, the detected value of the amount of movement of the rack shaft 22 corresponds to a state variable obtained from the turning unit 6.

In each of the above-described embodiments, the operation member that the driver operates to steer the vehicle is not limited to the steering wheel 3. For example, the operation member may be a joystick.

In each of the above-described embodiments, the steering-side motor 13 mechanically coupled to the steering wheel 3 is not limited to a three-phase brushless motor. For example, the steering-side motor 13 may be a direct-current motor with a brush.

In each of the above-described embodiments, it is not essential to include the steering-side speed reduction mechanism 14.

In each of the above-described embodiments, the turning unit 6 transmits rotation of the turning-side motor 32 to the conversion mechanism 34 through the transmission mechanism 33. However, without being limited thereto, the turning unit 6 may be configured to transmit rotation of the turning-side motor 32 to the conversion mechanism 34 through a gear mechanism, for example. Further, the turning unit 6 may be configured such that the turning-side motor 32 directly rotates the conversion mechanism 34. Moreover, the turning unit 6 may have a configuration including a second rack-and-pinion mechanism, and the turning unit 6 may be configured to convert rotation of the turning-side motor 32 into reciprocating motion of the rack shaft 22 by the second rack-and-pinion mechanism.

In each of the above-described embodiments, the turning unit 6 is not limited to the configuration in which the right turning wheel 5 and the left turning wheel 5 are turned in conjunction with each other. In other words, the right turning wheel 5 and the left turning wheel 5 may be independently controllable.

In the above-described embodiments, the steering device 2 has a link-less structure in which the steering unit 4 and the turning unit 6 are always mechanically separated from each other. However, without being limited thereto, the steering device 2 may have a structure in which the steering unit 4 and the turning unit 6 can be mechanically separated from each other by a clutch, for example.

What is claimed is:

1. A steering control system that controls a steering device of a vehicle, the steering device having a structure in which a power transmission path between a steering unit having an operation member and a turning unit configured to turn turning wheels is cut off, the steering control system comprising:
a storage unit that stores information relating to control of the steering device; and
a control unit configured to make a state transition to a normal control state via a start-up state after a power source system of the vehicle is started, wherein:
the start-up state is a state where the control unit executes a correction information storing process of acquiring correction element information using a state variable obtained from the steering device and further writing correction information obtained based on the acquired correction element information into the storage unit,
the normal control state is a state where the control unit executes a normal process of controlling the steering device using a control variable that is obtained by correcting the state variable based on the correction information,
the control unit is configured to execute, in the start-up state, an abnormal condition determination process of determining whether an abnormal condition indicating that the correction information having been written into the storage unit through the correction information storing process is abnormal is met,
the correction information storing process is a process that is re-executed when the abnormal condition is met, and
the abnormal condition determination process is a process that is executed at least either before or after the correction information storing process.

2. The steering control system according to claim 1, wherein:
the control unit is configured to execute, in the start-up state, an abnormality information storing process of writing abnormal condition information into the storage unit when writing of the correction information into the storage unit has failed to be completed; and
the abnormal condition determination process is a process that is executed before the correction information storing process, and includes a process of determining that the abnormal condition is met when the abnormal condition information has been written in the storage unit.

3. The steering control system according to claim 2, wherein:
the control unit is configured to execute, in the start-up state, a battery replacement condition determination process of determining whether a battery replacement condition indicating a state after a battery belonging to the power source system of the vehicle has been removed and replaced is met;
the correction information storing process is a process that is executed when the battery replacement condition is met and that is not executed when the battery replacement condition is not met; and
the abnormal condition determination process is a process that is executed before the battery replacement condition determination process.

4. The steering control system according to claim 1, wherein:

the steering device includes a sensor that detects an actually measured value corresponding to the control variable obtained by correction based on the correction information; and
the abnormal condition determination process is a process that is executed after the correction information storing process, and includes a process of determining whether the abnormal condition is met based on a result of comparing the control variable obtained by correction based on the correction information and the actually measured value obtained from the sensor.

5. The steering control system according to claim 1, wherein:
the correction information includes steering-side correction information and turning-side correction information, the steering-side correction information being information for correcting a control variable for steering that is used when controlling the steering unit, the turning-side correction information being information for correcting a control variable for turning that is used when controlling the turning unit;
the correction information storing process includes a steering-side correction information storing process and a turning-side correction information storing process, the steering-side correction information storing process being a process of acquiring steering-side correction element information using a state variable obtained from the steering unit and further writing the steering-side correction information obtained based on the acquired steering-side correction element information into the storage unit, the turning-side correction information storing process being a process of acquiring turning-side correction element information using a state variable obtained from the turning unit and further writing the turning-side correction information obtained based on the acquired turning-side correction element information into the storage unit; and
the abnormal condition determination process includes a process of determining whether an abnormal condition indicating that the steering-side correction information having been written into the storage unit through the steering-side correction information storing process is abnormal is met, and a process of determining whether an abnormal condition indicating that the turning-side correction information having been written into the storage unit through the turning-side correction information storing process is abnormal is met.

6. A steering control method for controlling a steering device of a vehicle, the steering device having a structure in which a power transmission path between a steering unit having an operation member and a turning unit configured to turn turning wheels is cut off, the steering control method comprising:
storing information relating to control of the steering device; and
making a state transition to a normal control state via a start-up state after a power source system of the vehicle is started, wherein:
the start-up state is a state where a correction information storing process is executed, the correction information storing process acquires correction element information using a state variable obtained from the steering device and further stores correction information obtained based on the acquired correction element information,
the normal control state is a state where a normal process is executed, the normal process controls the steering device using a control variable that is obtained by correcting the state variable based on the correction information, the method includes executing, in the start-up state, an abnormal condition determination process of determining whether an abnormal condition indicating that the correction information having been stored through the correction information storing process is abnormal is met, the correction information storing process is a process that is re-executed when the abnormal condition is met, and the abnormal condition determination process is a process that is executed at least either before or after the correction information storing process.

* * * * *